(12) United States Patent
Suzuki et al.

(10) Patent No.: US 7,452,633 B2
(45) Date of Patent: Nov. 18, 2008

(54) NON-AQUEOUS ELECTROLYTE SECONDARY BATTERY AND PROCESS FOR PRODUCING POSITIVE ELECTRODE FOR USE IN NON-AQUEOUS ELECTROLYTE SECONDARY BATTERY

(75) Inventors: Takashi Suzuki, Aichi (JP); Toshiyuki Miwa, Shizuoka (JP); Hiroto Sagisaka, Shizuoka (JP); Kenji Nabekura, Shizuoka (JP); Masanori Nakanishi, Shizuoka (JP); Minoru Inagaki, Shizuoka (JP)

(73) Assignee: FDK Corporation, Tokyo (JP)

( * ) Notice: Subject to any disclaimer, the term of this patent is extended or adjusted under 35 U.S.C. 154(b) by 302 days.

(21) Appl. No.: 11/103,420

(22) Filed: Apr. 11, 2005

(65) Prior Publication Data
US 2006/0292447 A1 Dec. 28, 2006

Related U.S. Application Data

(63) Continuation of application No. PCT/JP03/12906, filed on Oct. 8, 2003.

(30) Foreign Application Priority Data

Oct. 11, 2002 (JP) .............................. 2002-299238

(51) Int. Cl.
*H01M 4/58* (2006.01)
(52) U.S. Cl. .................................. 429/231.8
(58) Field of Classification Search ............... None
See application file for complete search history.

(56) References Cited

FOREIGN PATENT DOCUMENTS

| JP | 61-007567 A | 1/1986 |
|---|---|---|
| JP | 61-111907 A | 5/1986 |
| JP | 63-000964 A | 5/1988 |
| JP | 2003-203674 A | 7/1993 |
| JP | 2000-353511 A | 12/2000 |
| JP | 2001-351627 A | 12/2001 |

OTHER PUBLICATIONS

Takashi Suzuki et al., "Hosoka Kokuen Zairyo no Seikyoku Tokusei to Denchi Tokusei", Dai 43 Kai Battery Symposium in Japan, Oct. 12, 2002, 2A10, pp. 170-171.

*Primary Examiner*—Jonathan Crepeau
(74) *Attorney, Agent, or Firm*—Harness, Dickey & Pierce, PLC

(57) ABSTRACT

A non-aqueous electrolyte secondary battery in which a positive electrode formed of a graphite powder and an negative electrode formed of a material capable of absorption/desorption of a lithium metal or lithium are placed to face each other in an electrolyte containing lithium salt. The positive electrode of this battery where a Lc (112) which is the size of crystallite in a c axis direction which is calculated from a (112) diffraction line of a graphite crystal and determined by a powder X-ray diffraction method which is from 4 nm to 30 nm, and a charge capacity at the first cycle which is calculated on the basis of a total weight of the graphite material of the positive electrode filled in the battery is 20 to 50 (mAh/g). Preferably, the graphite powder of the positive electrode has an ratio (A/B) which is the ratio of a specific surface area A determined by a nitrogen absorption (BET) method to a surface area B determined on the basis of an area average diameter of 20 or less.

4 Claims, 15 Drawing Sheets

DISCHARGE CURVES OF GRAPHITE C

DISCHARGE CURVES OF GRAPHITE V

DISCHARGE CURVES OF GRAPHITE Q

DISCHARGE CURVES OF GRAPHITE L

DISCHARGE CURVES OF GRAPHITE R

DISCHARGE CURVES OF GRAPHITE N

DISCHARGE CURVES OF GRAPHITE O

A/B VALUES AND CAPACITY RETENTION RATES AFTER 1,000 CYCLES

I(004)/I(006) AND
CAPACITY RETENTION RATES AFTER 1,000 CYCLES

RELATIONSHIP OF CHARGE CAPACITY AT FIRST CYCLE,
DISCHARGE CAPACITY AT INITIAL CYCLE, AND
CAPACITY RETENTION RATE AFTER 1,000 CYCLES OF GRAPHITE Q

DISCHARGE CURVES OF GRAPHITE Q
(CHARGE CAPACITY AT FIRST CYCLE =10mAh/g)

DISCHARGE CURVES OF GRAPHITE Q
(CHARGE CAPACITY AT FIRST CYCLE =20mAh/g)

DISCHARGE CURVES OF GRAPHITE Q
(CHARGE CAPACITY AT FIRST CYCLE =50mAh/g)

**DISCHARGE CURVES OF GRAPHITE Q
(CHARGE CAPACITY AT FIRST CYCLE =60mAh/g)

**DISCHARGE CURVES OF GRAPHITE Q
(CHARGE CAPACITY AT FIRST CYCLE =80mAh/g)

FIG. 21 CHARGE/DISCHARGE CYCLE CHARACTERISTICS OF A 18650-TYPE CELL

DISCHARGE CAPACITY RETENTION RATES OF A 18650-TYPE CELL

DISCHARGE CURVES OF A 18650-TYPE CELL

NON-AQUEOUS ELECTROLYTE SECONDARY BATTERY AND PROCESS FOR PRODUCING POSITIVE ELECTRODE FOR USE IN NON-AQUEOUS ELECTROLYTE SECONDARY BATTERY

CROSS-REFERENCE TO RELATED APPLICATIONS

This application claims priority on PCT International Patent Application PCT/JP2003/012906 designating the United States of America, which was filed on Oct. 8, 2003, and which is herein incorporated by reference.

BACKGROUND OF THE INVENTION

1. Field of the Invention

The present invention relates to a non-aqueous electrolyte secondary battery in which a graphite material is applied as a positive electrode, a material capable of occlusion/desorption of a lithium ion, an alloy thereof or lithium is applied as an negative electrode, and a non-aqueous electrolyte containing lithium salt is applied as an electrolyte, and also relates to a method for preparing a positive electrode used for the non-aqueous electrolyte secondary battery.

2. Description of the Related Art

Conventionally, various non-aqueous electrolyte secondary batteries have been used in a wide range of applications because they have storable high energy density. However, they have shortcomings that at the time they reach a certain charge/discharge cycle, it becomes difficult to use them continuously, or it becomes impossible to use them anymore. For the purpose of improving a charge/discharge cycle life of these types of secondary batteries, the inventors of the present invention have focused on a non-aqueous electrolyte secondary battery which comprises a positive electrode formed of a graphite material, a non-aqueous electrolyte containing lithium salt, and an negative electrode formed of a material capable of absorption/desorption of a lithium metal or lithium, and they have diligently conducted research on such batteries.

There has been known a non-aqueous electrolyte secondary battery which comprises a positive electrode formed of a graphite material, an electrolyte containing lithium salt, and an negative electrode formed of a lithium metal. In addition, attempts have been made to enhance cycle characteristics by applying, as the negative electrode of the battery, a carbon material capable of absorption/desorption of lithium. See, for example, Japanese Patent Application Laid-Open Publication No. 61-7567, and Japanese Patent Application Laid-Open Publication No. 02-82466. This is because of a short cycle life of lithium metals, due to generation of dendrites and passivation of lithium metals resulting from repeated dissolution/deposition in accordance with charge/discharge cycles.

A non-aqueous electrolyte secondary battery with a configuration as described above is generally assembled to be in a discharged state, and the battery does not go into a dischargeable state unless it is charged. Hereinbelow, a case where a graphite material capable of reversible absorption/desorption of lithium is used as a negative electrode is taken as an example, and the charge/discharge reaction will be described.

Firstly, when charging at the first charge cycle, anions and cations (lithium ions) in an electrolyte are absorbed (intercalated) into the positive electrode (a graphite material) and the negative electrode, respectively. At the positive electrode, acceptor graphite intercalation compounds are formed, and at the negative electrode, donor graphite intercalation compounds are formed, respectively. Subsequently, upon discharging, cations and anions absorbed in the electrodes are desorbed (deintercalated), and the battery voltage is reduced. This charge/discharge reaction is represented by the following formulae.

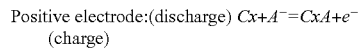
Positive electrode:(discharge) $Cx + A^- \rightleftarrows CxA + e^-$ (charge)

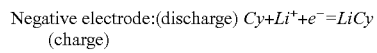
Negative electrode:(discharge) $Cy + Li^+ + e^- \rightleftarrows LiCy$ (charge)

Accordingly, it can be said that a positive electrode used in this type of the secondary battery utilizes a reaction by which acceptor graphite intercalation compounds derived from anions in an electrolyte are reversibly formed along with charging/discharging.

Materials as a positive electrode that have been studied include: graphitized carbon fiber (see Japanese Patent Application Laid-Open Publication No. 61-10882, for example); expanded graphite sheet (Japanese Patent Application Laid-Open Publication No. 63-194319); a woven textile made of graphitized carbon fiber (Japanese Patent Application Laid-Open Publication No. 04-366554); plastic-reinforcing graphite; natural graphite powder; pyrolytic graphite; graphitized vapor growth carbon fiber; and PAN carbon fiber.

However, this type of battery has a shortcoming in that the discharge capacity is reduced when every charge/discharge cycle is repeated. The main cause of this is deterioration of a positive electrode material. Specifically, since anions having relatively large molecular size are repeatedly absorbed in, and desorbed from a graphite material along with the repeated charge/discharge cycles, thereby causing collapse of a graphite crystal and cracks in particles. As a result, a part of the graphite material changes into a form that does not allow charging/discharging.

On the other hand, there is an example that a battery using graphitized vapor growth carbon fiber showed a cycle life of 400 cycles or more by limiting the charge capacity as low as 36 C/g (=10 mAh/g), per unit weight of the graphite material for the positive electrode) and by charging/discharging the battery. However, further improvement in cycle life was required.

Note that, in this application, the term "graphitization" refers to transition from an amorphous carbon to a graphite which is caused by thermal energy, and specifically, it refers to heat treatment of the amorphous carbon at 1700° C. or above regardless of crystallinity after graphitization (see "Glossary of Carbon Terms (Kaabon Yougo Jiten)", p. 114, 2000, Agune-shoufuu-sha). In addition, the term "carbon material" refers to a solid substance which contains a carbon atom as a principal component, in which the regularity of the carbon atoms is not specified. Similarly, the term "graphite powder" refers to a solid substance which contains a carbon atom as a principal component and has a crystal structure in which the carbon atoms are arranged with three dimensional regularity, and it does not matter whether or not it is a material that has been subjected to graphitization. Moreover, the average particle diameter is defined to be in the range of about 1 to 100 μm, as a general range.

SUMMARY OF THE INVENTION

The present invention has been accomplished in light of the foregoing problems, and an object thereof is to provide a non-aqueous electrolyte secondary battery which has a large capacity and excellent cycle characteristics, and a method for preparing a positive electrode used for this non-aqueous electrolyte secondary battery.

In order to solve the foregoing and other problems, a first aspect of the present invention is a non-aqueous electrolyte secondary battery in which a positive electrode formed of a graphite powder and an negative electrode formed of a material capable of absorption/desorption of, a lithium metal and lithium are placed to face each other in an electrolyte containing lithium salt, characterized in that the positive electrode has a Lc (112) which is the size of crystallite in a c axis direction which is calculated from a (112) diffraction line of a graphite crystal and determined by a powder X-ray diffraction method, is from 4 nm to 30 nm, and a charge capacity at the first cycle which is calculated on the basis of a total weight of a graphite material of the positive electrode filled in the battery is 50 (mAh/g) or less.

Generally, synthetic graphite powder is prepared as follows: an organic material such as petroleum pitch, coal tar pitch, a condensed polycyclic hydrocarbon compound or an organic high molecular compound is carbonized at 300° C. to 700° C. under nitrogen gas atmosphere or under atmosphere of inert gas such as argon gas or helium gas; thereafter, the material is further subjected to heat treatment (graphitization) at 2500° C. or above, more preferably at 3000° C. or above; and pulverized to adjust the particle size. In addition, graphite powders with raw materials of natural graphite materials which are produced naturally are prepared by pulverizing an ore containing a massive graphite, by performing repetitive flotation for the particles to obtain high standards of purity, and by further pulverizing to adjust the particle size.

However, even such graphite powders that are thus obtained is not preferable when they are highly crystallized, because the capacity is significantly reduced, which is associated with progression of charge/discharge cycles. This is because hexagonal net planes constituting the graphite crystal are stacked with each other only by weak van der Waals force, and therefore are cleaved easily when anions having a larger molecular size than the distance between hexagonal net planes are intercalated. Meanwhile, it is generally known that the higher the degree of crystallinity, the larger the capacity which allows absorption/desorption of anions, and is excellent in stability of a discharge curve, although this is only at the initial cycle. In the first aspect of the present invention, the degree of crystallinity of graphite crystal is defined based on the size Lc (112) of the crystallite in the c axis direction.

It is known that a stage structure is undergone when anions in an electrolyte are intercalated into a graphite material with high crystallinity (Y. Takada, R. Fujii and K. Matsuo, TANSO, 114, 120 (1983), J. A. Seel and J. R. Dahn, J.Electrochem.Soc., 892, 147(2000)). The stage structure refers to a state where intercalation layers are formed, when intercalates are intercalated in between layers of hexagonal net planes of carbons constituting the graphite crystal, and the intercalates are regularly inserted in every n (n is an integer) layer(s). This integer n is referred to as a stage number, and specifically means the number of graphite layers interposed between the intercalation layers. The stage number n reduces along with progression of charging, and when the stage number n becomes 1, a maximum number of intercalates are inserted, namely intercalates are inserted between all graphite layers.

Here, the number of molecules of the inserted substance (for example, electrolyte anions) constituting the intercalation layers tends to increase as the degree of graphitization increases, that is, as the crystallite size becomes larger. This is because reduction in crystallinity leads to increase in the lattice defects, making it difficult for the anions to be intercalated into such regions. Accordingly, it is possible to control the number of molecules in the intercalation layers according to crystallinity, that is, the crystallite size. As described above, reduction in the capacity caused by repetition of the charge/discharge cycles is collapse of a graphite crystal which is formed as a result of reversible intercalation of anions. In this respect, the inventors have established that the collapse hardly occurs when the number of molecules in the intercalation layers is slightly reduced. However, when the degree of crystallinity is insufficient, the charge/discharge capacity, that is, the number of molecules of anions that can be intercalated into a graphite crystal is reduced, and accordingly the crystal structure collapses because of its incomplete structure even when charging/discharging is performed at low capacity. Thus, cycle deterioration cannot be prevented. In other words, a graphite crystal, which has slightly smaller crystallites and a little lattice defects, is preferable rather than those with a perfect graphite crystal structure. Conversely, such a graphite crystal which has insufficient crystallinity and the crystallites are too small is not preferable.

On the other hand, while the spacing d (002) between adjacent hexagonal net planes of a graphite crystal is about 0.335 nm, the ionic radius of anions is as large as about 0.7 to 0.9 nm. For this reason, intercalation of anions into a graphite material significantly changes the relative positions of the adjacent hexagonal net planes. The changes of the relative positions described above are accumulated as a charge/discharge cycle is repeated, leading to an irreversible change. This phenomenon is also an irreversible change of a crystal structure, and an increase in the number of the changed regions reduces the region into which anions can be reversibly intercalated, thereby causing cycle deterioration. When completeness of a graphite crystal is high and crystallites are sufficiently developed, an irreversible change tends to occur in adjacent hexagonal net planes when a charge/discharge cycle is repeated, which is due to the extreme paucity of grain boundaries inside one graphite particle, resulting in the increase in cycle deterioration. On the other hand, when the crystallite size is slightly smaller and lattice defects are appropriately introduced, the number of the grain boundaries, that is, the number the grain boundaries existing inside one graphite particle, is large. These grain boundaries play a key role in preventing occurrence of an irreversible change of a crystal structure, which is associated with progression of charge/discharge cycle. For this reason, it is considered that it is harder for cycle deterioration to occur.

Accordingly, when the reaction where anions are reversibly intercalated is utilized for a positive electrode of a non-aqueous electrolyte secondary battery, use of a graphite material into which lattice defects are slightly introduced can provide improved cycle characteristics than use of a graphite material with a highly-developed crystal. Thus, in the first invention of the present application, the degree of crystallinity thereof is evaluated in terms of the Lc (112) value, and it is defined in the range from 4 to 30 nm. If the Lc (112) value is greater than 30 nm, although a large capacity can be provided within a predetermined voltage range, cycle deterioration is increased and is undesirable. Meanwhile, if the Lc (112) value is 4 nm or less, a smaller capacity can be provided within a predetermined voltage range, and additionally, cycle deterioration is increased which is undesirable. Furthermore, in addition to the Lc (112) value, the first invention of the present invention defines the charge capacity at the first cycle calculated on the basis of a total weight of the positive electrodes filled in the battery to be 20 to 50 (MAh/g).

The charge/discharge reaction mechanism at a positive electrode of a non-aqueous electrolyte secondary battery which is defined in the present invention is an irreversible intercalation reaction of anions as described above. However, the average operating voltage varies depending on the charge capacity at the first cycle. Specifically, the larger the charge capacity at the first cycle becomes, the more positive the average operating voltage becomes, and the smaller the charge capacity becomes, the more negative the average operating voltage becomes.

When charging is performed at the first cycle, anions in an electrolyte are absorbed between graphite layers. Then after discharging, anions are released in the electrolyte. However, a large irreversible capacity is generated at the first cycle. Note that, for the second and subsequent cycles, the charge/discharge efficiency is a value near to 100%. The charge/discharge efficiency at the first cycle varies depending on various properties of the graphite material, and is generally smaller than charge/discharge efficiency at the second and subsequent cycles.

When the same graphite materials are used for comparison of the charge/discharge efficiencies, the charge/discharge efficiency at the first cycle varies depending on the charge capacity at the first cycle, and reduces as the charge capacity increases. The capacity equivalent to its irreversible capacity is absorbed in such a state where anions are held intercalated between graphite layers, that is, in a state where they can not be released (a state where discharging is impossible) by using electrochemical techniques. Here, the so-called "residual compounds" are formed. As described above, the reason why the irreversible capacity generated at the first cycle increases as the charge capacity increases at the first cycle, is that the amount of the residual compounds formed at the first cycle increases as the charge capacity increases at the first cycle. The factor which determines the positive electrode voltage is the amount of anions absorbed between the graphite layers, and therefore the average operating voltage shifts to a more positive value as the amount of residual compounds increases.

Thus, when charging/discharging is performed within a predetermined voltage range, the charge/discharge capacity is inevitably reduced as the charge capacity at the first cycle is made larger. This is because the larger the charge capacity at the first cycle is, the more positive the operating voltage at subsequent charging/discharging becomes, and if the same capacity is to be obtained, the charge voltage needs to be set at a higher level as the charge capacity at the first cycle is made larger. As described above, when the reaction where anions are reversibly intercalated is used for a positive electrode, it is critically important to define the charge capacity at the first cycle because the charge capacity at the first cycle significantly influences subsequent charge/discharge characteristics.

For the second and subsequent cycles, when charging/discharging is performed within a predetermined voltage range, in this case, the smaller the charge voltage at the first cycle is, the larger the charge/discharge capacity becomes as described above. However, when the charge capacity at the first cycle is smaller than the charge/discharge capacity at the second and subsequent cycles, capacity reduction associated with progression of charge/discharge cycles is large and undesirable. This is because cycle characteristics depend on the state of the residual compounds which are formed when charging/discharging is performed at the first cycle, and the graphite crystal tends to collapse even when the amount of the residual compounds is small.

At the second and subsequent cycles, when an operation of charging to a predetermined charge capacity and discharging to a predetermined voltage is repeated, the larger the charge capacity at the first cycle is, the more positive the voltage at the end of charging becomes. This phenomenon follows from the fact that the average operating voltage becomes more positive as the charge capacity at the first cycle increases. The subsequent discharge capacities are not influenced by the charge capacity at the first cycle, and are the same.

When the charge capacity at the first cycle is too large, the charge voltage that is needed to acquire a predetermined charge/discharge capacity becomes high and an electrolyte is subjected to oxidative destruction, causing increase in cycle deterioration which is undesirable. Moreover, as described above, even when charging/discharging is performed within a predetermined voltage range, if a charge capacity at the first cycle is too large, the discharge capacity at the second and subsequent cycles reduces and is undesirable.

In this connection, the first aspect of the present invention defines that the charge capacity at the first cycle should be 20 to 50 (mAh/g), the charge capacity calculated on the basis of the weight of the graphite material for the positive electrode and the weight of positive electrodes in the area facing the negative electrodes. Here, the positive electrode capacity per unit weight can be calculated by dividing the charge capacity of the entire battery by the total weight of the positive electrodes filled in the battery.

A second aspect of the present application is the non-aqueous electrolyte secondary battery of the first aspect of the present invention, characterized in that the graphite powder of the positive electrode has a ratio (A/B) of a specific surface area A which is determined by a nitrogen absorption (BET) method and a surface area B which is determined from an area average diameter which is 20 or less.

The crystallites of a graphite exist in a state where hexagonal net planes constituted by carbon atoms are laminated with three-dimensional regularity. However, the carbon atoms constituting a hexagonal net plane are firmly bonded together by conjugated double bonds which can be seen in a benzene ring, and the hexagonal net planes are loosely bonded together only by van der Waals forces. Thus, the shape and properties of the crystallites are rich in anisotropy. When a graphite powder or a massive graphite which is constituted by these crystallites is pulverized, shear deformation is generated along planes in the early stage of pulverization as a result of an extremely loose bond between the graphite layers. Thus, a rhombohedral structure appears. It is considered that continuous addition of mechanical energy by pulverization causes particle surfaces to be cleaved and separated, leading to fine particles. Thus, the surfaces of graphite particles after pulverization do not have smooth surfaces but have rough surfaces.

In the interlayers constituted by the hexagonal net planes having the described rough shape, the adjacent hexagonal net planes are loosely bonded together by bonding forces (van der Waals forces), and intercalation of anions existing in an electrolyte leads to collapse of a crystal lattice, thus leading to capacity reduction along with progression of charge/discharge cycles and is undesirable. This is undesirable because a volume space of interlayers including planes existing in a particle surface makes up large proportion of a volume space of crystalline interlayers exiting inside the particles, resulting in a proportionately less capacity, which cannot be ignored.

Such a rough shape is hard to identify only on the basis of the particle diameter measured by using a general laser diffraction particle size distribution analyzer. The general particle size distribution analyzer calculates the particle diameter, and in principle, they can not make corrections for a surface shape which includes irregularities. Meanwhile, a specific surface area (hereinafter referred to as a BET surface area), determined by a nitrogen absorption procedure, can reflect a degree of roughness of the particle surface by an increase in the surface area. However, only by comparing these values, it is difficult to determine whether the change in the value of the surface area is caused by the particle diameter or by the rough surface shape. Thus, the inventors established that it is possible to evaluate the rough shape of the particles by comparing the surface area calculated from the particle size distribution and the BET surface area, and thus completed the second aspect of the present invention.

Here, "a surface area determined on the basis of area average diameter" which is defined in the second aspect of the present invention refers to a surface area ($m^2/g$) which is calculated from the particle diameter measured by using a laser diffraction particle size distribution analyzer and from the area average diameter calculated from the number of the particles.

Here, the shape of all particles is assumed to be a ball, and with regard to a certain particle group, a total surface area, a total weight and a true density of a particle are defined as S, M and $\rho$, respectively. Thus, the following equations are established.

$$S = \Sigma(ni \times \pi \times Di^2) \quad \text{Equation (2)}$$

$$M = \Sigma(\pi/6 \times \rho \times ni \times \pi \times Di^3) \quad \text{Equation (3)}$$

Meanwhile, the following Equation (4) is derived from the equations (2) and (3).

$$S/M = 6/(\rho \times D) \quad \text{Equation (4)}$$

where D is the area average diameter calculated from the following Equation (5).

$$D = (\Sigma(ni \times Di^3))/(\Sigma(ni \times Di^2)) \quad \text{Equation (5)}$$

In addition, S/M in the Equation (4) represents the surface area ($m^2/g$) on the particle weight basis. Note that the unit of specific surface area determined by a nitrogen absorption (BET) procedure is also ($m^2/g$). For this reason, the ratio which is defined in the second aspect of the present invention, that is, the ratio of the specific surface area (A) determined by using the nitrogen absorption (BET) procedure to the surface area (B) determined on the basis of area average diameter is a dimensionless value.

When there is roughness on the particle surface, the surface area (B) determined on the basis of the area average diameter is smaller than the specific surface area (A) determined by a nitrogen absorption (BET) procedure, and accordingly the ratio (=A/B) becomes large. In the second aspect of the present invention, the ratio (=A/B) is to be 20 or less, and the amount of rough particle surface is defined. If the value is 20 or more, the capacity reduction associated with progression of charge/discharge cycles is increased and is undesirable as described above.

A third aspect of the present invention clearly identifies influences which a pulverization operation and the like exert on a crystal lattice and the charge/discharge capacity, by specifically defining a graphite powder for the positive electrode on the basis of distortion of a crystal lattice. The mechanical energy which is given by pulverization or the like similarly influences the charge/discharge capacity of the positive electrode, although the way it influences the charge/discharge capacity of the positive electrode is different from that in the second invention where particle surface damage caused by pulverizing is defined. The effect of the third aspect is the same as the effect of the second aspect. Specifically, the third aspect of the present invention is a non-aqueous electrolyte secondary battery, characterized in that a graphite powder of the positive electrode, which is defined in the first aspect and the second aspect, has an intensity ratio I(004)/I(006) of 15 or less, which is the ratio of an intensity I (004) of a diffraction line corresponding to a (004) surface to an intensity I (006) of a diffraction line corresponding to a (006) surface, determined by an X-ray wide angle diffraction method.

Use of such a graphite material having small lattice distortion between adjacent hexagonal net planes and having a crystal structure with high completeness makes it possible to significantly improve cycle characteristics, while maintaining a large absorption/desorption capacity. The lattice distortion between adjacent hexagonal net planes can be evaluated on the basis of intensity ratio I (004)/I (006), that is, the ratio of the intensity I (004) of a diffraction line corresponding to a (004) surface to the intensity I (006) of a diffraction line corresponding to a (006) surface, which can be determined by an X-ray wide angle diffraction method.

When a graphite material in which a crystal is developed to some extent where the Lc (112) value is 4 nm or more is measured by an X-ray wide-angle diffraction method using an X-ray diffractometer, the 001 diffraction line generated as a result of diffraction from the (001) surface does not appear, and the second-order reflection appears as the (002) diffraction line. This can be regarded as the first-order reflection from the (002) surface. The (004) diffraction line generated from the fourth-order reflection can be regarded as the first-order reflection from the (004) surface which does not actually exist. In other words, when the Bragg's equation that defines the diffraction conditions for an X-ray is modified into $\lambda = 2 \times d/n \times \sin \theta$ (where d is a spacing between lattice planes, n is an integer, $\theta$ is a peak location of a diffraction line, and $\lambda$ is a wavelength of an X-ray), this equation is satisfied in a case where d/n is obtained by dividing the spacing between lattice planes d by the integer n. Thus, higher-order reflections, where n is 2, 3, . . . need no parallel atomic planes therein.

When the crystallite size of a graphite material is calculated from the width of the diffraction line, the crystallite size Lc (004) in the c axis direction which is determined on the basis of the (004) diffraction line, is a value that is smaller than the crystallite size Lc (002) in the c axis direction which is determined on the basis of the (002) diffraction line. Generally, the crystallite size calculated using a higher-order diffraction line is smaller than that value calculated using a lower-order diffraction line. This is considered to be due to the fact that actual carbons do not have layer lattice in an ideal structure and distortion is present in crystal lattices.

The (004) diffraction line and the (006) diffraction line which are defined in the present application, are diffraction lines that are derived from the second-order and third-order reflections from the (002) surface. For this reason, when the lattice distortion between adjacent hexagonal net planes is small, the intensity of the (006) diffraction line relative to the (004) diffraction line is increased, and accordingly the intensity ratio I (004)/(006) is reduced. If this value is 15 or more, the lattice distortion becomes too large, leading to reduction in the capacity which allows reversible absorption/desorption along with progression of charge/discharge cycles. Thus, cycle deterioration is increased and is undesirable. This is because, when anions are repeatedly absorbed into, and desorbed from a graphite material having large lattice distortion, the crystal structure tends to suffer from an irreversible change, resulting in the decrease of the crystal regions where charging/discharging is possible.

In a fourth aspect of present invention, in the method for preparing a positive electrode used for a non-aqueous electrolyte secondary battery is specifically defined a method for preparing a graphite material for a positive electrode of the above-described non-aqueous electrolyte secondary batteries of the first to third aspects. Specifically, the fourth aspect of the present invention is the method for preparing a positive electrode used for the non-aqueous electrolyte secondary batteries of the first to third aspects, where graphite powder of the positive electrode is formed by pulverizing one or more types of the materials selected from graphitizable carbon material, starting material thereof, or a carbon precursor until an average particle diameter thereof becomes 50 μm or less, and by subjecting the materials to heat treatment under an inert gas atmosphere, and graphitizing it.

The essence of the preparation method is as follows: when obtaining graphite powder, subjecting a starting material to a pulverization treatment prior to a graphitization treatment, and after graphitization, performing pulverization only to the extent that distortion is introduced in the crystal structure. The graphite powder thus prepared in such method, has little distortion in the crystal structure compared to a graphite powder prepared by subjecting a massive material to graphitization treatment, and then pulverizing and adjusting the particle size. Thus, the crystal structure is less likely to collapse even when anions with a relatively large molecular size are intercalated.

As typical starting materials for graphitizable carbon materials, there are various pitches such as coal tar pitch and petroleum pitch. These pitches can be obtained by subjecting a raw material such as coal tar or crude oil to a refining or a reforming process such as distillation, extraction, heat decomposition, or dry distillation.

Further, organic high molecular compounds can be used, such as condensed polynuclear aromatic resin (COPNA resin), with raw materials of aromatic compounds such as naphthalene, phenanthrene, anthracene, pyrene, perylene and acenaphtylene; and polyvinyl chloride resin. These starting materials undergo a liquid phase state when they are heated to around 350° C. during a heat treatment stage, thereby facilitating generation of polycondensed polycyclic hydrocarbon compounds and three-dimensional lamination of these compounds. Thus, an anisotropic region is formed and carbon precursors are produced. Upon subsequent heat treatment, the precursors are in a state where they can easily produce graphite materials. Further, the anisotropic region is referred to as the carbonaceous mesophase, and the larger the anisotropic region is (i.e., the closer to a bulk mesophase state), the more likely that a graphite material having high completeness of a crystal structure can be obtained after a graphitization treatment. For this reason, these materials are particularly preferable as the raw materials for the graphite powder defined in the present invention.

A graphitizable carbon is produced in a manner that the above-described organic material is used as the starting material, and is carbonized at a temperature of 300° C. to 700° C. under nitrogen gas atmosphere or inert gas atmosphere such as argon gas or helium gas, and thereafter, the material is calcinated at the maximum temperature between approximately 900° C. and 1500° C.

Mesophase-pitch based carbon fiber, pyrocarbon, mesocarbon microbeads, pitch coke or petroleum coke, or needle coke, as the carbon materials, are also graphitizable carbon materials, and are suitable for starting materials for the graphite powder defined in the present invention.

One or more types of materials selected from the above-described graphitizable carbon material, starting material thereof or carbon precursor needs to be pulverized in advance until the average particle diameter becomes 100 μm or less prior to performing the graphitization treatment. The reason is that, the material needs to be molded into an electrode mix without being subjected to pulverization treatment after graphitization treatment. A positive electrode mix is kneaded with a graphite material which has been subjected to graphitization treatment, and a binder, and in some cases with a conductive agent. After the electrode mixture is constituted, the electrode mixture is molded to a predetermined size, and is incorporated into a battery. In order to mold such an electrode mix into a desired size, as graphite powder, powder having an average particle diameter at least 100 μm or less needs to be used. Note that, the term average particle diameter used here refers to a volume average diameter (cumulative volume 50% diameter: d 50), and is essentially different from area average diameter used in the third aspect.

In light of positive electrode characteristics of the graphite powder after the graphitization treatment, the smaller the average particle diameter of the raw material powder before graphitization treatment is, the more preferable it is, and the average particle diameter is preferably 30 μm or less, more preferably 10 μm or less, and especially preferably 5 μm or less. As the raw material powder before graphitization treatment is more finely pulverized, the edges account for a larger proportion of the total surface area of the graphite powder after the graphitization treatment, thus facilitating smooth intercalation reaction of anions. This is because anions are intercalated into a crystal structure from the edge portions of the graphite.

As a method of pulverizing one or more types of material selected from the graphitizable carbon material and starting material thereof, or carbon precursor, any common pulverizer such as a pin mill, a ball mill, and a colloidal mill can be used. For graphitization treatment to be performed after pulverization, heat treatment is to be performed at 2400° C. or above under an inert gas atmosphere, preferably about 3000° C., so that the Lc (112) of the graphite powder after graphitization treatment ranges between 4 to 30 nm.

A fifth aspect of the present invention defines a simple process step by which the graphite powder pulverized after graphitization treatment can be used as a positive electrode material. In other words, the fifth aspect of the present invention is a method for preparing a positive electrode material, characterized in that a graphite powder with an average particle diameter of 50 μm or less is subjected to heat treatment at 1700° C. or above under an inert gas atmosphere. A unit cell of the graphite crystal is a hexagonal crystal. When such a hexagonal graphite is pulverized, shear deformation is generated along planes, and a rhombohedral structure appears. As described above, the carbon-carbon bonds in the planes are extremely firm, and mechanical energy provided by pulverization is accumulated as the hexagonal net planes with high planarity is partially distorted, and the rhombohedral structure is introduced.

The proportion of existence of such rhombohedral crystal structures and hexagonal crystal structures can be determined by analyzing the intensity ratio of diffraction peaks that can be obtained by an X-ray wide-angle diffraction method. When measurement is made by using a Geiger Flex model powder X-ray Diffractometer where steel is used for the vessel, it is only necessary to scan in the vicinity where the diffraction angle (2θ/θ) is 40 to 50° (Hereinafter, when it is simply represented as diffraction angle, this is to show the case of measurement by the Geiger Flex model powder X-ray wide-angle diffractometer with steel used for the vessel).

In the case of a sample obtained by pulverizing a graphite having high crystallinity, generally, four diffraction lines can be seen in this spectrum band. A (100) plane and a (101) plane of a hexagonal crystal appear near 42.3° and near 44.4°, and a (101) plane and a (012) plane of a rhombohedral crystal appear near 43.3° and near 46.0°. Note that, the plane indices of the rhombohedral crystal are represented as assumed that a unit cell similar to that of a hexagonal crystal is employed.

When a graphite material including such a rhombohedral crystal is subjected to heat treatment at 1700° C. or above under inert gas atmosphere, the most part of the graphite material is transformed into a hexagonal graphite, the accumulated mechanical energy accumulated by pulverization is released, and lattice distortion is significantly reduced, thus enhancing completeness of the hexagonal graphite structure. Similarly, even when a graphite material consisting of only a hexagonal crystal structure is used, the graphite powder obtained by pulverizing the graphite material after the graphitization treatment also includes lattice distortion. However, by conducting heat treatment, the completeness of the hexagonal graphite structure is enhanced, and significantly reduces distortion. Note that, reduction in lattice distortion caused by heat treatment, does not refer to growth of crystallites, because the crystallite size calculated by an X-ray diffraction method is not necessarily consistent with completeness of the hexagonal graphite structure. The graphite powder thus obtained has little lattice distortion, and has a developed hexagonal crystal structure, so that even when anions are intercalated into the graphite powder, the crystal structure does not easily collapse, resulting in significant improvement in charge/discharge cycle characteristics.

The positive electrode thus obtained is kneaded with a conductive agent and a binder, and is molded as a positive electrode mixture and incorporated into a battery. Further, the positive electrode materials according to the present invention originally exhibit high conductivity, and conductive agents may be unnecessary. However, in view of the battery applications, they can be used if necessary. As the conductive agents, various graphite materials and carbon blacks have been generally used. In the case of the non-aqueous electrolyte secondary battery according to the present invention, a graphite material functions as a positive electrode, and thus graphite materials are not suitable as the conductive agents. For this reason, use of conductive carbon blacks are preferable.

As carbon blacks that can be used herein, any of channel black, oil furnace black, lamp back, thermal black, acetylene black, and Ketjen Black can be used. However, carbon blacks other than acetylene black are prepared using a part of petroleum pitch or coal tar pitch as raw material, and therefore they may include a large amount of impurities such as sulfur compounds or nitrogen compounds. For this reason, these impurities are preferably removed before using such carbon blacks. Meanwhile, acetylene black is prepared only using acetylene as a raw material, and is produced by a sequential pyrolysis method. Thus, impurities are less likely to mix in acetylene black, leading to a highly-developed chain structure of particles. Thus, acetylene black exhibits excellent liquid retentivity and low electric resistance and is particularly preferable for this type of conductive agent.

The conductive agent and the graphite material according to the present invention can be combined in an appropriate mixing ratio, depending on the batteries' application. When improved rapid charging characteristics and high-power discharging characteristics are required matters for the completed battery, preferably, the conductive agent is mixed with the graphite material according to the present invention in a range that sufficient conductivity to constitute a positive electrode mixture can be obtained. However, when the graphite material contains an excessive amount of the conductive agent, the amount of positive electrode material to be filled is reduced by that amount, thus leading to reduction in the capacity (volume energy density) and is undesirable.

Further, as the binders, organic high molecular compounds such as, fluorine resin including poly vinylidene fluoride (PVDF), polytetra fluoroethylene (PTFE), and poly vinyl fluoride (PVF), carboxymethyl cellulose, polyimide resin, polyamide resin, polyacrylic acid, and polyacrylic acid soda, are appropriate because they do not dissolve into an electrolyte and have excellent resistance to solvents.

As described above, the positive electrode mixture is prepared using in addition to the graphite material according to the present invention, a binder and a conductive agent if necessary. After combining and molding the mixture, it is incorporated into a battery.

Meanwhile, any material can be used for a negative electrode as long as they are capable of electrochemically absorbing/desorbing lithium ions. The examples include lithium metals, lithium-aluminum alloys, graphite materials, graphitizable carbon materials, non-graphitizable carbon materials, niobium pentaoxide ($Nb_2O_5$), lithium titanate ($Li_4Ti_5O_{12}$), silicon monoxide (SiO), tin protoxide (SnO), complex oxide of tin and lithium ($Li_2SnO_3$) and complex oxide of lithium, phosphorous and boron ($LiP_{0.4}B_{0.6}O_{2.9}$, for example). In particular, when a-carbon material such as a graphite material, a graphitizable carbon material, or non-graphitizable carbon material is used as a negative electrode, the voltage at which lithium is absorbed/desorbed is low, reversibility is high, and the capacity is large. For these reasons, when the present invention is applied, they exert an extraordinary effect. Examples of the carbon materials include various types of natural graphites that have been subjected to appropriate pulverization treatment, synthetic graphites, graphite materials such as expanded graphites, mesocarbon microbeads that have been subjected to carbonization treatment, mesophase-based pitch carbon fiber, vapor growth carbon fiber, pyrolytic carbon, carbon materials such as petroleum coke, pitch coke and needle coke, synthetic graphite materials obtained by subjecting these carbon materials to graphitization treatment, and a mixture thereof. The negative electrode is also formed by combining the material selected from those listed above, a binder, and the conductive agent if necessary, and by molding the mixture to configure a negative electrode mix which is incorporated into a battery. In this case, materials that are illustrated when the positive electrode mixture is prepared can be used as is for the binders and conductive agents.

As non-aqueous electrolytes, there are a non-aqueous electrolyte obtained by dissolving lithium salt into an organic solvent, a solid electrolyte obtained by dissolving lithium salt into a solid substance having lithium ion conductivity, and the like.

A non-aqueous electrolyte is prepared by dissolving lithium salt into an organic solvent, and any organic solvents and lithium salts can be adopted as long as they can be used for this type of battery. Examples of organic solvents include propylene carbonate (PC), ethylene carbonate (EC), butylene carbonate (BC), y-butyrolactone (GBL), vinylene carbonate (VC), acetonitrile (AN), dimethyl carbonate (DMC), diethyl carbonate (DEC), ethylmethyl carbonate (EMC), methylpropyl carbonate (MPC) and derivatives thereof, or a mixture solvent thereof.

Here, a sixth aspect of the present invention is a non-aqueous electrolyte secondary battery, characterized in that, an electrolyte of the non-aqueous electrolyte secondary battery defined in the first aspect to the third aspect is a non-aqueous electrolyte prepared by dissolving lithium salt into the non-aqueous solvent, and is a non-aqueous electrolyte secondary battery in which vinylene carbonate accounts for 0.1 to 10 volume % of the total volume of the non-aqueous solvent.

The oxidative decomposition voltage of vinylene carbonate (hereinafter abbreviated to "VC") is lower compared to other cyclic carbonates, that is, propylene carbonate (PC) and ethylene carbonate (EC), or chain carbonates, that is, dimethyl carbonate (DMC), diethyl carbonate (DEC), and ethylmethyl carbonate (EMC), and a distinct oxidative decomposition reaction can be confirmed in a voltage range higher than 4.9 (V vs Li+/Li) even under atmosphere of 25° C.

Thus, VC is considered to be more susceptible to oxidative decomposition than other cyclic or chain carbonates. However, the present inventors have found that when acceptor graphite intercalation compounds are formed at a positive electrode as a product of charging, passive films are formed on the surface of the particles once oxidative decomposition of VC occurs, further oxidative decomposition is inhibited by the film, and as a result, the voltage at which oxidative decomposition occurs improves compared to other cyclic or chain carbonates; oxidative destruction caused by these compounds can be inhibited at the same time; and cycle characteristics of this type of non-aqueous electrolyte secondary battery can be improved. Thus, the sixth aspect of the present invention is completed.

Here, the thickness of the passive films which are formed on the surface of the particles is proportional to the volume ratio of VC on the basis of the total volume of the non-aqueous solvent. When the volume ratio of VC is 0.1 volume % or less, the thickness of films which are generated in the charging process is not sufficient. Thus, at the positive electrode in the charging process, VC itself is further subjected to oxidative destruction, and moreover, oxidative decomposition reaction of other cyclic or chain carbonates cannot be inhibited. Further, when the volume ratio of VC is 10 volume % or more, the thickness of the passive films to be formed is too thick, and the charge/discharge reaction, that is the reaction where electrolyte anions are reversibly intercalated is inhibited, leading to significant reduction in the charge/discharge capacity, and to increase in resistance polarization associated with progression of charge/discharge cycles. Thus, cycle deterioration occurs and is undesirable. In view of the above, the volume ratio of VC relative to the total volume of the non-aqueous solvent is limited to 0.1 to 10 volume %.

Note that any lithium salts can be adopted as long as they can be used for this type of battery. The examples are, $LiPF_6$, $LiBF_4$, $LiClO_4$, $LiGaCl_4$, $LiBCl_4$, $LiAsF_6$, $LiSbF_6$, $LiInCl_4$, $LiSCN$, $LiBrF_4$, $LiTaF_6$, $LiB(CH_3)_4$, $LiNbF_6$, $LiIO_3$, $LiAlCl_4$, $LiNO_3$, $LiI$ and $LiBr$, and the like.

As in the case of conventional non-aqueous electrolyte secondary batteries, the amount that these salts are dissolved into an organic solvent can be appropriately set in a range of 0.5 to 4.0 (mol/L), or preferably in a range of 0.8 to 3.5 (mol/L), more preferably in a range of 1.0 to 3.0 (mol/L).

The positive electrode and negative electrode parts constituted as described above are placed in a hermetically sealed vessel in such a manner that they are dipped in a non-aqueous electrolyte in which lithium salt is dissolved. Thus, a non-aqueous electrolyte secondary battery to which the present invention is applied is completed.

Features and benefits of the present invention other than the above will become clear by reading the detailed description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

Figure 1A:
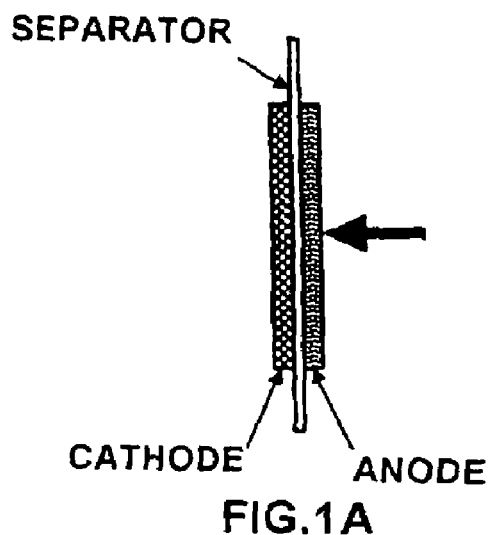
FIGS. 1A to 1F are diagrams showing a combination of a positive electrode and a negative electrode.
Figure 1D:
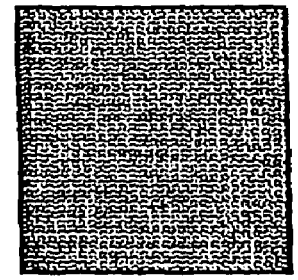
Figure 1B:
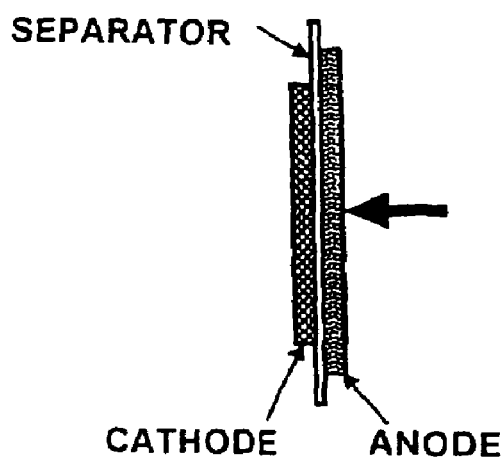
Figure 1E:
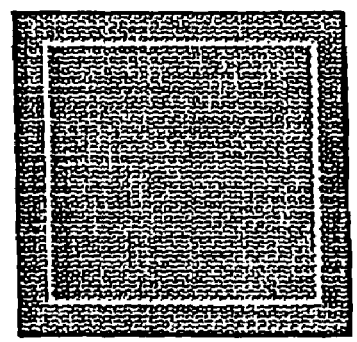
Figure 1C:
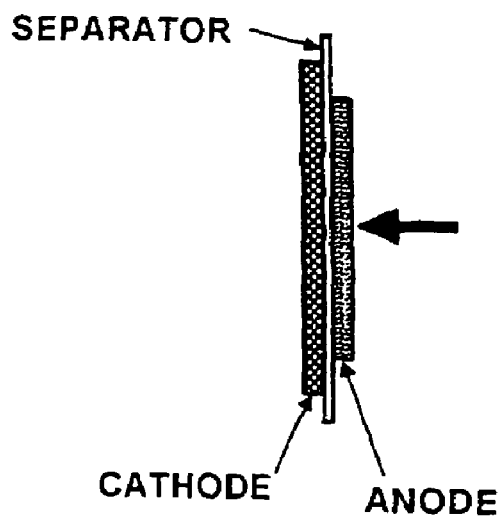
Figure 1F:
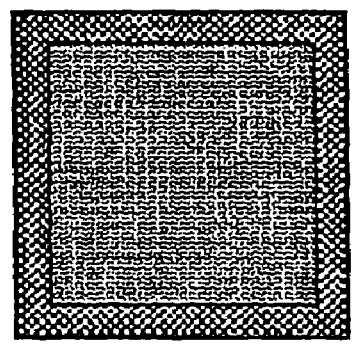

At least the following matters will be made clear by the explanation in the present specification and the description of the accompanying drawings.

1. Measurement of Properties (1) Method of Calculating the Crystallite Size Lc (112) in the c Axis Direction.

As an internal standard reference material, a high-purity silicon powder for X-ray standard (manufactured by Furuuchi Chemical Corporation, 99.999%) was added to a sample in an amount of approximately 10% by weight, and then mixed. The mixture was then filled into a sample cell. Here, the CuKα ray monochromatized with a graphite-monochromator was used as a radiation source, and wide-angle X-ray diffraction curves were measured by a reflective diffractometer method. The voltage and current, which are to be applied to an X-ray vessel, were set at 40 kv and 40 mA. A divergence slit was set at 2°, a scattering slit was set at 2°, and a photoreceiving slit was set at 0.3 mm. Thus, scanning was performed in the 2θ range of 81° to 89° at a rate of 0.25°/min. In accordance with a technical literature (JSPS, No. 117 committee, Carbon, 25, (No. 36), 1963), regarding the resultant diffraction patterns, the diffraction angle and the half-width of the (112) diffraction line of the graphite material, in which 2θ appeared near 83.6°, were corrected by using the (422) diffraction line of the silicon powder, in which 2θ appeared near 88.1°. Thus, the crystallite size Lc (112) in the c axis direction was calculated.

(2) Measurement Method of an Average Particle Diameter (A Volume Average Diameter: d50)

Average particle diameters of the coke materials (including carbon precursors) and the graphite powders obtained in the examples was measured using a laser diffraction particle size distribution measuring device (MicroTrac MT3000, manufactured by NIKKISO Co., Ltd.).

(3) Method of Calculating the Ratio of a Specific Surface Area A Determined by Nitrogen Adsorption (BET) Method to a Surface Area B Determined on the Basis of an Area Average Diameter(=A/B)

The specific surface area A to be determined by a nitrogen adsorption (BET) method was measured by performing vacuum drying at 120° C. for 3 hours using BELSORP28 manufactured by Bel Japan, Inc; and thereafter, measurement and calculation were made by using a nitrogen gas absorption method. Further, the surface area B determined on the basis of the area average diameter was measured by using the laser diffraction particle size distribution measuring device (MicroTrac MT3000, manufactured by NIKKISO Co., Ltd), then the area average diameter D was calculated in accordance with equation (2), and thereafter, the particle surface area B to be determined on the basis of particle size distribution was calculated in accordance with equation (3). Thus, the ratio (=A/B) was calculated.

$$D = \Sigma(nd^3)/\Sigma(nd^2) \quad \text{Equation (2)}$$

(where, d is a particle diameter, and n is a number of particles)

$$B = 6/(\rho \times D) \quad \text{Equation (3)}$$

(4) I(004)/I(006)

The ratio of the intensity I(004) of the diffraction line corresponding to the (004) plane, to the intensity I(006) of the diffraction line corresponding to the (006) plane, that is, the intensity ratio I(004)/I(006), was measured using a powder X-ray wide-angle diffraction instrument where copper is used for the vessel. The X-ray diffraction patterns were obtained by filling graphite powder into a sample holder; setting the voltage and current to be applied to the X-ray vessel were set at 40 kV and 40 mA, the divergence slit was set at 1°, scattering slit was set at 1°, and photoreceiving slit was set at 0.30 mm, and sequential scanning was performed from the low angle side toward the high angle side in the diffraction angle (2θ/θ) range of 10° to 90° at a scanning rate of 2°/min. Here, base lines were drawn at the respective peaks of the (004) diffraction line which appear near the 54° diffraction angle (2θ/θ) and the (006) diffraction line which appears near the 87° diffraction angle (2θ/θ). Using these base lines, substantial intensities of the diffraction lines were again plotted, and the maximum intensity constituting its peak was defined as the intensity of the diffraction line. Thus I(004) and I(006) were determined, and thus the I(004)/I(006) ratio was calculated.

2. Preparation of Graphite Powder

Graphite materials A to X were obtained by the methods (1) to (22) described below. The properties of the graphite powders were measured by the above-described procedure 1. Table 1 shows the results.

(1) Graphite A

Anthracene was placed into an autoclave, nitrogen gas with a pressure of 50 kg/cm$^2$ was sealed therein, followed by heating to 800° C., and thus anthracene was carbonized. At this time, the heating rate was set at 100° C./hour from room temperature to 250° C., 50° C./hour from 250° C. to 550° C., and 100° C./hour from 550° C. to 800° C. The massive coke thus obtained was roughly pulverized with a stamp mill, and was subsequently pulverized into fine particles with a jet mill. Thus, carbon precursor powder with an average particle diameter of 24.3 μm was obtained. This powder was placed in a graphite crucible, was heated to 2300° C. at a heating rate of 300° C./hour under argon gas atmosphere, was retained for 1 hour, and allowed to stand to cool to room temperature.

(2) Graphite B

The coal tar pitch Hi-Pellet (manufactured by THE KANSAI COKE AND CHEMICALS CO., LTD.) was heated to 1200° C. at a heating rate of 10° C./hour, was retained for 1 hour, and was subsequently allowed to stand to cool to room temperature, and a massive pitch coke was obtained. This pitch coke was roughly pulverized with a stamp mill, and was then pulverized into fine particles with a jet mill. Thus, a pitch coke powder with an average particle diameter of 15.6 μm was obtained. This powder was placed into a graphite crucible, was heated to 2300° C. at a heating rate of 300° C./hour under argon gas atmosphere, and was retained for 1 hour, and allowed to stand to cool to room temperature.

(3) Graphite Powder C

Graphite powder C was prepared in the same procedure as in the case of the graphite A with the exception that the temperature of the final heat treatment of the graphite A was changed to 2600° C.

(4) Graphite Powder D

Graphite powder D was prepared in the same way as in the case of the graphite B with the exception that the temperature of the final heat treatment of the graphite B was changed to 2500° C.

(5) Graphite Powder E

Graphite powder E was prepared in the same way as in the case of the graphite A with the exception that the temperature of the final heat treatment of the graphite A was changed to 2800° C.

(6) Graphite F

Anthracene (manufactured by TOKYO KASEI KOGYO CO., LTD.) and benzaldehyde (manufactured by KANTO KAGAKU Co., Ltd.) was mixed at a mole ratio of 1:15. Para toluene sulfonic acid monohydrate (manufactured by KANTO KAGAKU Co., Ltd.) was then added by an amount of 6.0% by weight to the mixture, further was heated at a temperature of 160° C. under nitrogen flow with continuous mixing, and was retained for 1 hour. The condensed polycyclic polynucle araromatic compound thus obtained was charged into a graphite crucible, which was then installed to an electric furnace. Under nitrogen atmosphere, the compound was heated to 350° C. at a heating rate of 70° C./hour, and was retained for 15 hours. Thereafter, the compound was further heated to 700° C. at a heating rate of 70° C./hour, retained for 1 hour, and under nitrogen atmosphere was allowed to stand to cool to room temperature. The massive carbon block thus obtained was charged into a graphite crucible, and under argon gas atmosphere was heated to 2400° C. at a heating rate of 300° C./hour, and retained for 1 hour and allowed to stand to cool to room temperature. The obtained graphite block was temporarily roughly pulverized with a pin mill, and then pulverized into fine particles with a jet mill.

(7) Graphite G

Graphite powder G was prepared in the same procedure as in the case of the graphite F with the exception that the temperature of the final heat treatment of the graphite F was changed to 2800° C.

(8) Graphite H

The graphite C was pulverized into fine particles with a jet mill, and the powder was charged into a graphite crucible. Under argon gas atmosphere, the powder was heated to 2800° C. at a heating rate of 300° C./hour, retained for 1 hour, and allowed to stand to room temperature.

(9) Graphite I

The massive pitch coke which was obtained in the preparation process of the graphite B, was temporarily roughly pulverized with a stamp mill, and was further pulverized into fine particles with a jet mill, to obtain a pitch coke powder with an average particle diameter of 50.0 μm. The powder was charged into a graphite crucible. Under argon gas atmosphere, the powder was heated to 2300° C. at a heating rate of 300° C./hour, was retained for 1 hour, and allowed to stand to cool to room temperature.

(10) Graphite J

The graphite powder D was prepared according to the same procedure as in the case of the graphite B with the exception that the temperature of the final heat treatment of the graphite B was changed to 2800° C.

(11) Graphite K

The massive pitch coke, which had been obtained in the preparation process of the graphite B, was temporarily roughly pulverized with a stamp mill, and subsequently was pulverized into fine particles with a jet mill, to obtain a pitch coke powder with an average particle diameter of 3.4 μm. This powder was charged into a graphite crucible, under argon gas atmosphere, the powder was heated to 2300° C. at a heating rate of 300° C./hour, and was retained for 1 hour and allowed to stand to cool to room temperature.

(12) Graphites L to N

Mesophase pitch AR120 manufactured by MITSUBISHI GAS CHEMICAL COMPANY, INC. was heated to 1200° C. at a heating rate of 50° C./hour, was retained for 1 hour, was allowed to stand to cool to room temperature, to obtain a massive carbon block. This block was charged into a graphite crucible, under argon gas atmosphere, the block was then heated to 2800° C. at a heating rate of 300° C./hour, was retained for 1 hour, and was allowed to stand to cool to room temperature. The resultant graphite block was temporarily roughly pulverized with a pin mill, and subsequently was pulverized into fine particles with a jet mill. The rate and the air pressure at which the roughly-pulverized graphite powder was charged into the jet mill were controlled to obtain graphites L to N with different particle diameters.

(13) Graphite O

The graphite powder N with an average particle diameter of 6.6 pm was charged into a graphite crucible as powder. Under argon gas atmosphere, the powder was heated to 1700° C. at a heating rate of 300° C./hour, was retained for 1 hour, and was allowed to stand to cool to room temperature.

(14) Graphite P

Acenaphthylene was placed into an autoclave. Thereafter, nitrogen gas with a pressure of 50 kg/cm$^2$ was sealed therein, followed by heating to 700° C. Thus the acenaphthylene was carbonized. At this time, the heating rate was set at 100° C./hour from room temperature to 250° C., 50° C./hour from 250 to 550° C., and 100° C./hour from 550 to 700° C. The massive coke thus obtained was temporarily roughly pulverized with a stamp mill, and was subsequently pulverized into fine particles with a jet mill. Thus, pitch coke powder with an average particle diameter of 23.5 μm was obtained. The coke thus obtained was placed into an electric furnace, was heated to 2400° C. under nitrogen atmosphere, and was retained for 5 hours. Subsequently, the powder was allowed to stand to cool to room temperature.

(15) Graphite Q

The graphite powder Q was prepared according to the same procedure as in the case of the graphite F with the exception that the temperature of the final heat treatment of the graphite P was changed to 2600° C.

(16) Graphite R

The graphite powder R was prepared according to the same procedure as in the case of the graphite F with the exception that the temperature of the final heat treatment of the graphite P was changed to 2800° C.

(17) Graphite S

Pyrene and benzaldehyde were mixed at a molar ratio of 1:1. Para toluene sulfonic acid was then mixed with the mixture so a weight ratio thereof to the resultant mixture is 20:1, and was mixed with nitrogen gas flow. While continuing mixing, the reaction temperature was raised to 160° C., and this state was retained for 100 minutes, and was allowed to stand to cool to room temperature. The resultant resin was heated to 1200° C. at a heating rate of 50° C./hour, and was retained for 1 hour. Subsequently, the resin was allowed to stand to cool to room temperature, and a massive carbon block was prepared. This block was temporarily roughly pulverized with a stamp mill, and was subsequently pulverized into fine particles with a jet mill, to produce carbon powder. This carbon powder was charged into an electric furnace, and was heated to 3000° C. under nitrogen airflow and retained for 5 hours. Subsequently, the powder was allowed to stand to cool to room temperature.

(18) Graphite T

Anthrone and polyphosphoric acid were mixed at a molar ratio of 7:100, and heated at 140° C. for 24 hours. After standing to cool, distilled water was added to the mixture, and was further stirred, and residual polyphosphoric acid was decomposed to phosphoric acid. Thereafter, ammonium hydrogen-carbonate was added to the black massive resin, to neutralize phosphoric acid. The remaining black massive resin was refluxed with methanol. Thereafter, additionally using methanol, unreacted materials were extracted with a Soxhlet extraction apparatus. The resultant black massive resin was heated to 1200° C. at a heating rate of 50° C./hour, and was retained for 1 hour. Subsequently, the black massive resin was allowed to stand to cool to room temperature. Thus, a massive carbon block was prepared. This block was temporarily roughly pulverized with a stamp mill, and was subsequently pulverized into fine particles with a jet mill, to produce carbon powder. This carbon powder was charged into an electric furnace, and was heated to 3000° C. under nitrogen airflow, then retained for 5 hours. Subsequently, the powder was allowed to stand to cool to room temperature.

(19) Graphite U

The graphite powder Q was prepared according to the same way as in the case of the graphite F with the exception that the temperature of the final heat treatment of the graphite P was changed to 3000° C.

(20) Graphite V

Perylene and benzaldehyde were mixed at a mole ratio of 1:2. Para toluene sulfonic acid was then added at an amount of 5.0% by weight of the total weight of the mixture. The mixture was heated at a temperature of 150° C. for 15 hours. The resultant black-green massive resin was heated to 1200° C. at a heating rate of 50° C./hour, was retained for 1 hour and was allowed to stand to cool to room temperature. Thus, a massive carbon block was prepared. This block was temporarily roughly pulverized with a stamp mill, and was subsequently pulverized into fine particles with a jet mill, to produce a carbon powder. This carbon powder was charged into an electric furnace, and was heated to 3000° C. Under nitrogen airflow, and retained for 5 hours. Subsequently, the powder was allowed to stand to cool to room temperature.

(21) Graphite W

The massive pitch coke, which was obtained in the preparation process of the graphite B, was charged into a graphite crucible. Under argon gas atmosphere, the massive pitch coke was heated to 2800° C. at a heating rate of 300° C./hour, and retained for 1 hour. Subsequently, the massive pitch coke was allowed to stand to cool to room temperature. The resultant graphite block was temporarily roughly pulverized with a pin mill. Subsequently, the pulverized block was pulverized into fine particles with a jet mill.

(22) Graphite X

The massive pitch coke, which was obtained in the preparation process of the graphite P, was charged into a graphite crucible. Under argon gas atmosphere, the massive pitch coke was heated to 2800° C. at a heating rate of 300° C./hour, and was retained for 1 hour. Subsequently, the massive pitch coke was allowed to stand to cool to room temperature. The resultant graphite block was temporarily roughly pulverized with the pin mill, and subsequently, was pulverized into fine particles with a jet mill.

3. Preparation of Test Cells

The graphite powders (A to X) were mixed with 2% by weight aqueous solutions of CMC (carboxymethyl cellulose) (manufactured by Daiichi Kogyo Co., Ltd., CELLOGEN 4H) at a weight ratio of 97:3, respectively. Distilled water was added to the mixtures to obtain slurries. Note that, with respect to the weight ratio, the ratio of CMC is the ratio of the solid content thereof. With a Doctor Blade method, the resultant slurries were respectively applied on one side of aluminum foils (thickness: 20 μm) so that the amount of a graphite material per unit area is approximately 8.0 mg/cm$^2$, followed by drying at 60° C. for 20 minutes. Thus, sheet-shaped electrodes were fabricated. Thereafter, the sheets were mounted in die sets, and then compressed and molded by a pressing machine, so that the apparent density of positive electrode mixtures is to be approximately 0.90 g/cm$^3$. Using a punching press, the resultant sheet electrodes were punched out to produce sheet electrodes with a size of ϕ 9 mm, which were used as working electrodes for test cells.

Figure 2:
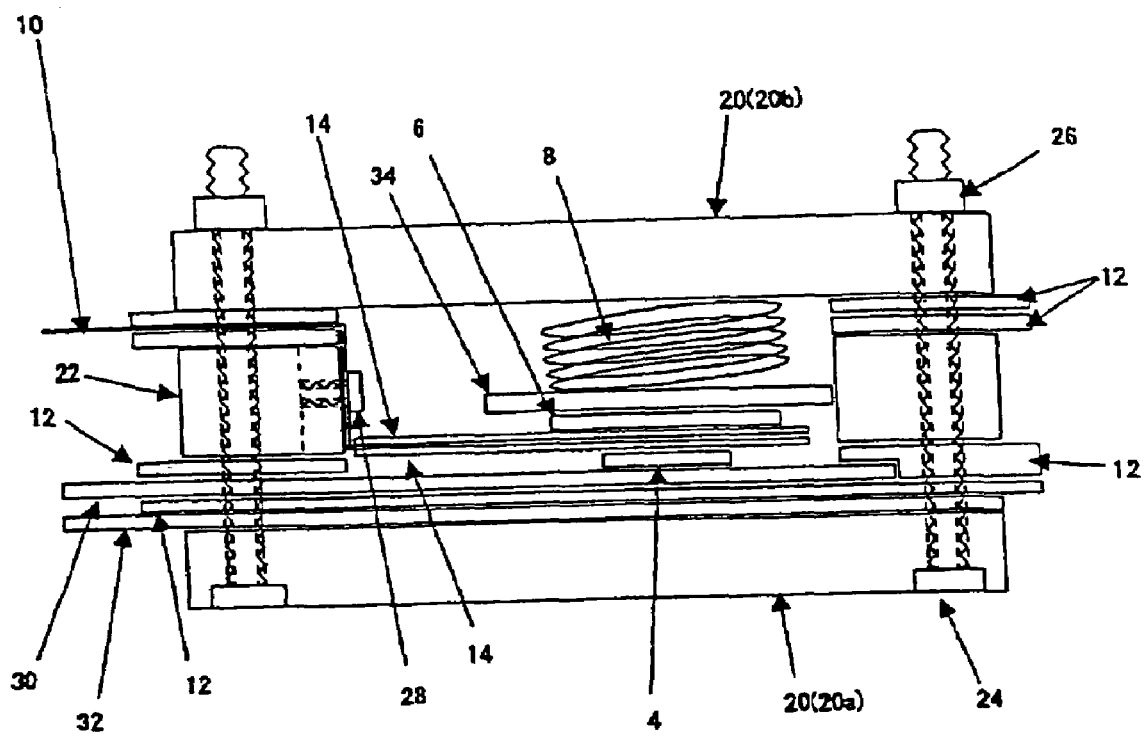
FIG. 2 is a cross-sectional view of a test cell.

FIG. 2 shows a cross-sectional view of a test cell. This test cell 2 is a three-electrode cell system in which a working electrode 4 and a counter electrode 6 are pressed by a spring 8 between a pair of top and bottom stainless-steel fixed plates 20a and 20b. A sheet electrode 4a punched to be ϕ 9 mm was used as the working electrode 4 at the lower side, and as the counter electrode 6 and a reference electrode 10 lithium electrodes 6a were used. The sheet electrode 4a was subjected to vacuum drying at 120° C., Parafilms 12 were subjected to vacuum drying at 120° C., and other resin components and metal components were subjected to vacuum drying at 120° C., for 10 hours or more respectively. Thus, the test cell 2 was assembled at a dew point of −40° C. or less under dry air atmosphere. An insertion block 22 made of polypropylene is interposed between the stainless-steel fixed plates 20 and 20, and is fixed and fastened thereto by bolts 24 and nuts 26. The Parafilms 12 are interposed between the upper surface of the insertion block 22 and the stainless-steel fixed plate 20 and between the lower surface of the insertion block 22 and the stainless-steel fixed plate 20.

As a separator 14 to be interposed between the working electrode 4 and the counter electrode 6, two sheets of polypropylene non-woven fabric 14a (porosity 78.6%) with a thickness of 100 μm are used overlaying one on the other, and a lithium metal 10a constituting the reference electrode 10 is inserted therebetween in such a manner that it does not come in contact with the counter electrode 6 and the working electrode 4. This reference electrode 10 is fixed to the insertion block 22 by a fixing bolt 28. The sheet electrode 4a and the separator 14 are respectively placed into Teflon vessels filled with an electrolyte for vacuum impregnation, and then incorporated into the test cell 2. The electrolyte used therein is a mixture of a solvent mixed with propylene carbonate (PC) and ethylmethyl carbonate (EMC) in a volume ratio of 1:2, with LiPF6 dissolved in a concentration of 2 mol/L, and only 0.5 weight part of vinylene carbonate was mixed per 100 weight parts thereof.

In between the working electrode 4 at the lower side and the stainless-steel fixed plate 20a, are interposed from the top side an aluminum plate 30, the Parafilm 12, and a polypropylene plate 32. Further, a stainless-steel disc 34 is placed on the upper surface of the counter electrode 6 provided at the top side. The spring 8 is inserted in a compressed manner between the stainless-steel disc 34 and the upper side fixed plate 20b.

After the test cell was assembled, a charge/discharge cycle was performed in a thermostatic chamber at 25° C. under atmospheric condition. The first charge/discharge cycle was performed under the conditions where the current value was set to 20 mA/g on the graphite weight basis of the working electrode 4, the cell was charged until the charge capacity becomes 40 (mAh/g) on the graphite weight basis, and after a 1 minute pause, the cell was discharged at the same current until a potential 3.0 (V vs Li+/Li) is attained for the working electrode 4, relative to the reference electrode 10. Next, the following charge/discharge cycle was repeated 9 times, by charging the cell to 4.70 (V vs Li+/Li) at a constant current adopting the same current density as above, and after a 1 minute pause, discharging at the same current to 3.0 (V vs Li+/Li). The 10 cycles performed up to this point are a preparatory processes before performing normal charging/discharging, and are not included in the actual charge/discharge cycles.

The next eleventh cycle was defined as the first cycle (hereinafter, referred to as the "initial cycle"), and normal charge/discharge cycles were performed by the following procedure. A charge/discharge cycle where the cell was charged to 4.65 (V vs Li+/Li) at a constant current to achieve 300 (mA/g) on the graphite weight basis, and after 1 minute pause, where the cell was discharged to 3.0 (V vs Li+/Li) at a constant current to achieve 1 (mA/cm$^2$) on the apparent area basis of the working electrode 4, was repeated a 1,000 times. Table 1 shows the charge capacities at the first and thousandth cycles and the capacity retention ratio (the ratio of the charge capacity at the thousandth cycle to the charge capacity at the first cycle).

Note that, with regard to the graphite Q, by a similar operation, the charge capacity at the first cycle was set to be 10, 15, 20, 40, 50, 55, 60, 70 and 80 ((mA/g), at a constant current of the same current density. The subsequent charge/discharge operation was performed in a similar manner.

4. Preparation of a Battery

Figure 3:
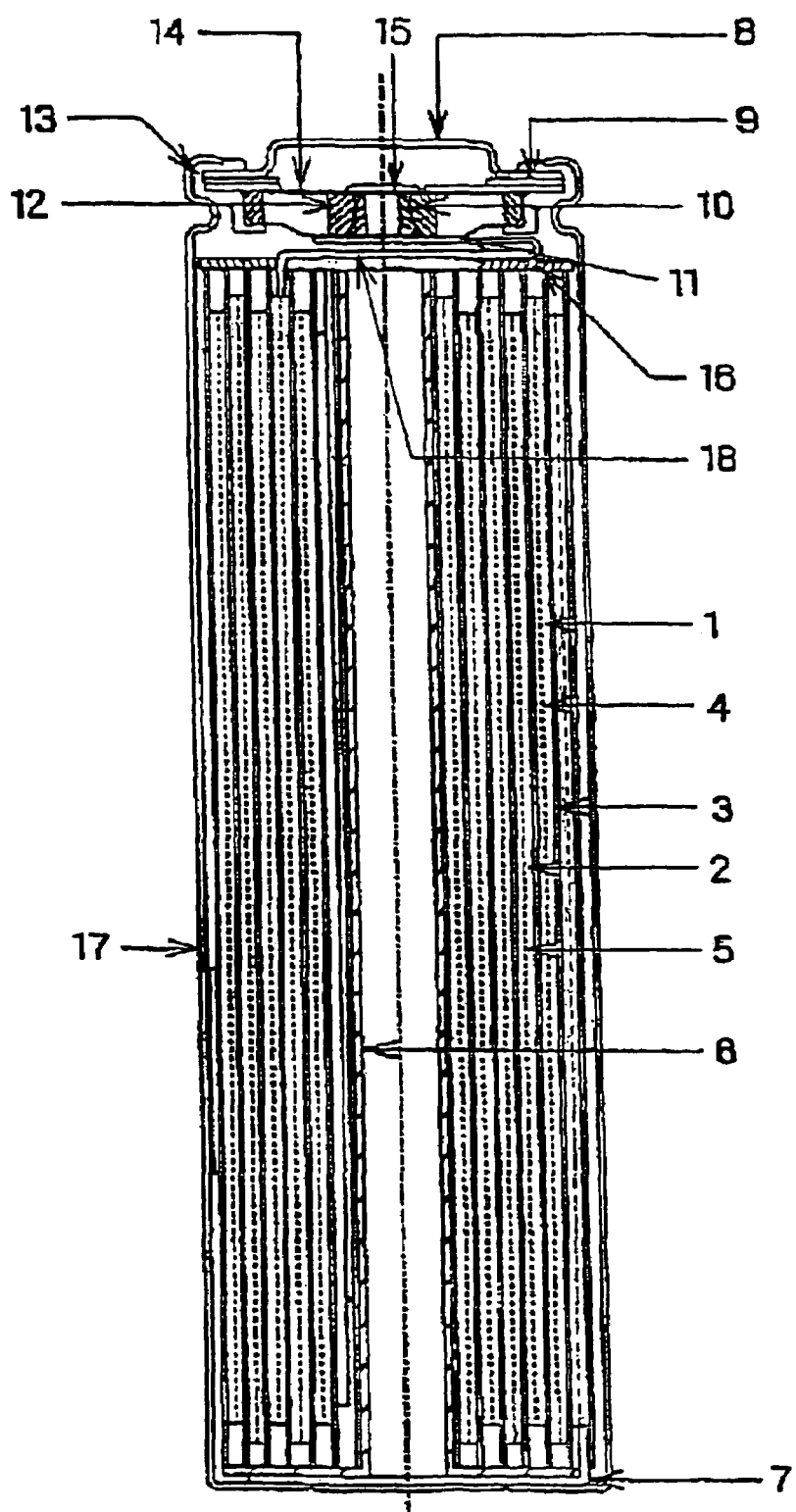
FIG. 3 is a diagram showing a structure of a 18650-type spiral lithium secondary battery.

FIG. 3 is a structure of an 18650-type spiral lithium secondary battery to which the present invention is applied. In FIG. 3, reference number 1 denotes a positive electrode plate, which is a strip-shaped sheet electrode obtained by mixing the graphite F which is the positive electrode material and carboxymethyl cellulose which is a binder at a volume ratio of 97:3; adding ion-exchanged water to knead the mixture into paste to be a slurry, and applying the slurry to both sides of an aluminum foil 4 with a thickness of 20 μm, thereafter, drying and rolling the aluminum foil 4 and cutting it to a width of 56 mm. Note that the graphite weight per unit area was controlled to become 8.0 g/cm$^2$ in the coating process, and the mixture density of the sheet electrode was controlled to become 0.9 g/cm$^3$ in the rolling process. From a part of this sheet, the mixture was scraped out in the direction perpendicular to the longitudinal direction of the sheet. An aluminum positive electrode lead plate 18 was attached on a current collector by ultrasonic welding. The reference number 2 denotes a negative electrode formed of a negative electrode carbon material. LPC-U manufactured by Nippon Steel Chemical Co., Ltd. was sequentially pulverized by a pin mill and a jet mill, to be a fine powder with an average particle diameter of 3.2 μm, and 95 weight parts of this fine powder and 5 weight parts of polyvinylidene difluoride resin (KF#1100, manufactured by Kureha Chemical Industry, Co., Ltd.) were mixed, and N-methyl-2-pyrrolidinone as a solvent was added, to give a slurry. This slurry was applied to both sides of a copper foil 5 with a thickness of 14 μm, and thereafter, the copper foil 5 was dried and rolled, and then cut to a width of 54 mm to make a strip-shaped negative electrode sheet. From a part of this sheet the mixture was scraped out in the direction perpendicular to the longitudinal direction of the sheet. A nickel negative electrode lead plate 7 was attached on a current collector by spot welding. Note that the carbon weight per unit area was controlled to become 1.0 mg/cm$^2$ in the coating process, and the mixture density of the sheet electrode was controlled to become 1.0 g/cm$^3$ in the rolling process. These positive electrode and negative electrode were inserted in a case 17 wound in a spiral form, with a polyethylene porous film separator 3 interposed therebetween. After the insertion, the lead plate 7 was spot welded to the center position of the bottom of the case 17, thereafter, an electrolyte was injected therein. The electrolytes used were solvents where propylene carbonate (PC) and diethyl carbonate (DEC) were mixed with a 1:2 volume ratio, vinylene carbonate (VC) was respectively mixed with the solvents at various volume ratios; and LiPF6 was dissolved into the mixtures at a concentration of 2.0 (mol/L). The following Table 2 shows the volume ratios of the solvents.

TABLE 2

Volume Ratios Of Solvents Contained in the Electrolytes Used

| | Propylene Carbonate | Diethyl Carbonate | Vinylene Carbonate |
|---|---|---|---|
| Electrolyte A | 33.33 | 66.67 | 0.00 |
| Electrolyte B | 33.32 | 66.63 | 0.05 |
| Electrolyte C | 33.30 | 66.60 | 0.10 |
| Electrolyte D | 31.67 | 63.33 | 5.00 |
| Electrolyte E | 30.00 | 60.00 | 10.00 |
| Electrolyte F | 29.33 | 58.67 | 20.00 |

After the insertion, an explosion-proof lid element equipped with a current-blocking mechanism is fitted with a gasket 13, and thus electric power generation elements are sealed. The lid element includes a metal positive electrode terminal plate 8, an intermediate pressure-sensitive plate 14, conductive components (10, 11) formed of a protruded part 10 protruding in an upper direction and a base part 11, and the insulating gasket 13. Vents are formed in the positive electrode terminal plate 8 and the fixed plate 12. In the conductive components (10, 11), an upper surface of the protruded part 10 is exposed to the top face of the fixed plate 12, and the bottom surface of the base part 11 is exposed to the bottom surface of the fixed plate 12. The gasket 13 is fitted into the inner periphery of the opening portion of the battery case 17. The fixed plate 12 is fitted into the inner periphery of the gasket 13. The intermediate pressure-sensitive plate 14 and the positive electrode terminal plate 8 are laminated on the fixed plate 12. The conductive components (10, 11) and the intermediate pressure-sensitive plate 14 are connected with each other at the protruded part 10 of the conductive components (10, 11), and are electrically continuous only at this contacting portion which includes its connection part 15. The tip end of the positive electrode lead plate 18 is connected to the base part 11 of the conductive components (10, 11). The opening portion of the battery case 17 is crimped inward, thus, the gasket 13 is compressed and the battery case 17 is hermetically sealed with the lid element. When the internal pressure of the battery case 17 reaches a predetermined value, the intermediate terminal plate 14 expands externally. Thus, a rupture takes place around the connection part 15 of the protruded part 10 of the conductive components (10, 11), leading to a configuration in which a conductive path between the positive electrode lead plate 18 and the positive electrode terminal plate 8 is to be blocked.

The reference number 6 denotes a polypropylene insulating base plate having holes, so as to have the same area as the space A generated when the electrodes are wound. Moreover, the reference number 16 denotes an insulating plate that is inserted to prevent a short circuit between the spiral electrode groups and the positive electrode lead plate. Note that, the completed battery size is a cylindrical shape (18 φmm ×650 mm).

A charge/discharge cycle where the battery was charged to 4.6 V at a constant current of 200 mA, and discharged to 2.5 V was performed 10 times. Thereafter, the following charge/discharge cycle was repeated 50,000 times for 10 minutes where charging was performed at a constant current and constant voltage, with the voltage at 1 A and the current at 4.5 V, and discharging was performed at a constant current of 1 A.

<<Results and overview of the Examples>>

Table 1 shows, with respect to all the tested graphite materials A to X, the discharge capacities at the initial cycle, the discharge capacities after 1,000 cycles and the discharge capacity retention ratios after 1,000 cycles. Note that the term "discharge capacity retention ratio" is the value expressed in terms of the percentage (%) of the ratio of the discharge capacity after 1,000 cycles to the discharge capacity at the initial cycle.

Figure 4:
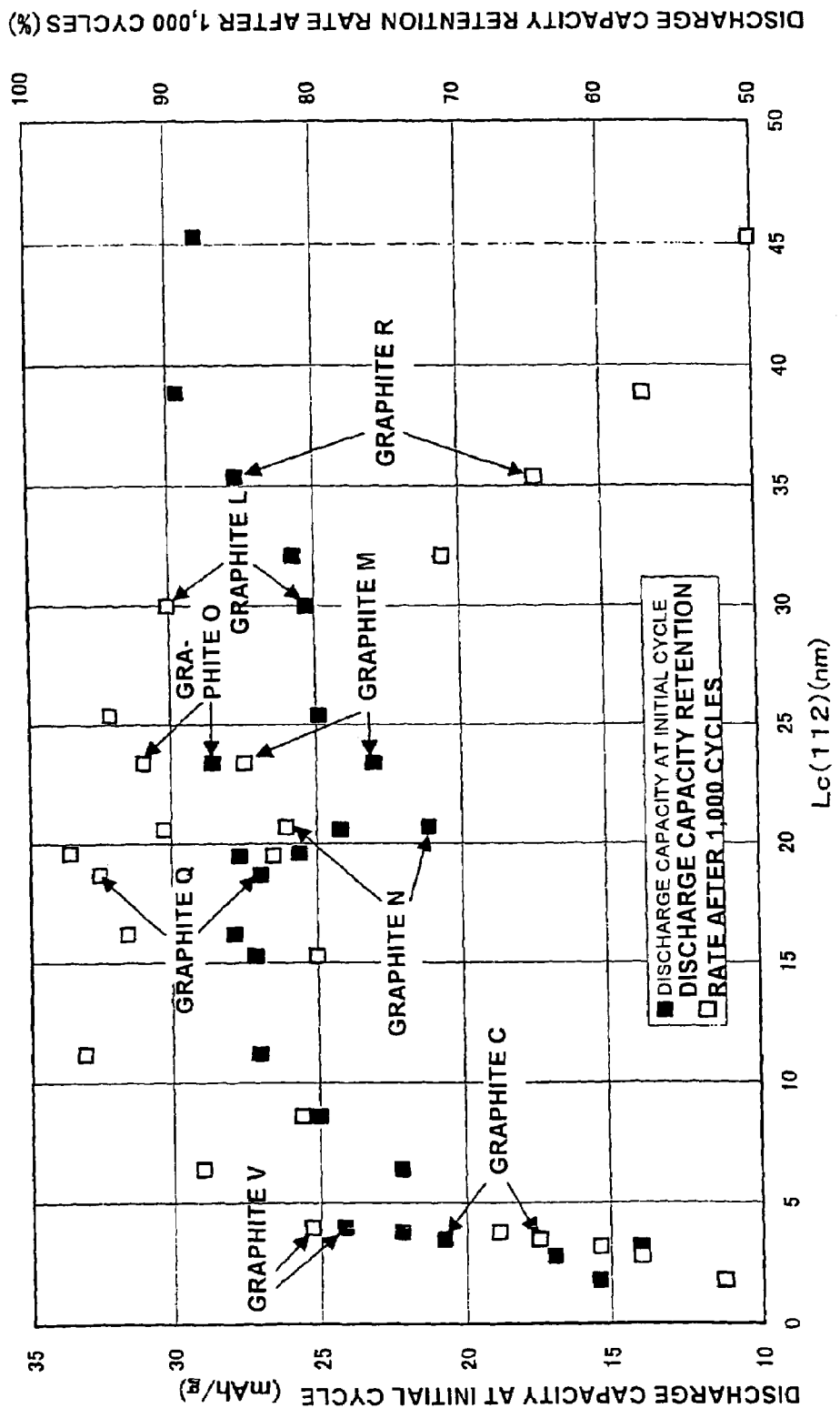
FIG. 4 is a diagram showing a relation between an Lc (112) value of a graphite material, and a discharge capacity at an initial cycle, and a capacity retention rate after 1,000 cycles.
Figure 5:
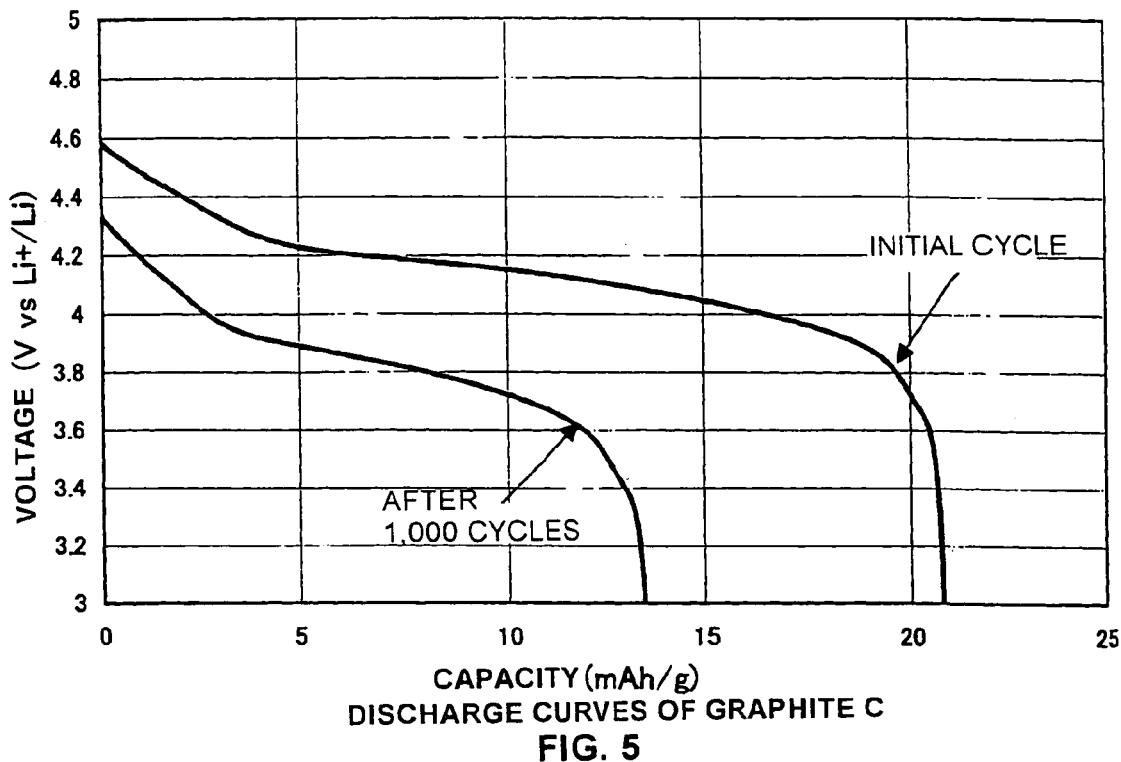
FIG. 5 is a diagram showing discharge curves of a graphite C.
Figure 6:
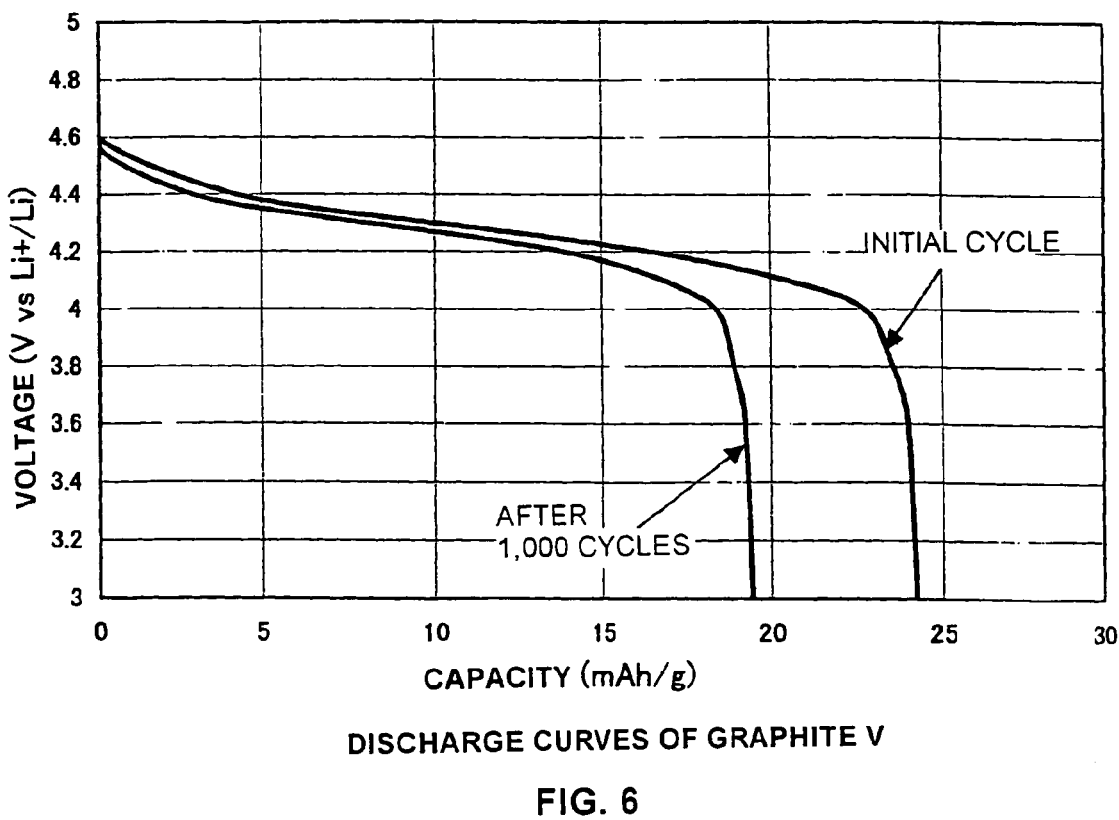
FIG. 6 is a diagram showing discharge curves of a graphite V.

Regarding the graphite materials A to X shown in Table 1 exhibiting a charge capacity of 40 mAh/g at the first cycle, a relationship between the Lc (112) value of the graphite material, and the discharge capacity at the initial cycle and and the capacity retention ratio after 1,000 cycles, are shown in FIG. 4. It was observed that the discharge capacity at the initial cycle became larger as the Lc (112) value increases. This is considered to be because of increase in the crystalline sites where anions can be reversibly intercalated, since larger crystallites facilitate development of a graphite structure and accordingly the region where adjacent hexagonal net planes are arranged with regularity is made wider. As typical examples, discharge curves of the graphites C, V, L and R are shown in FIGS. 5 to 9.

Figure 10:
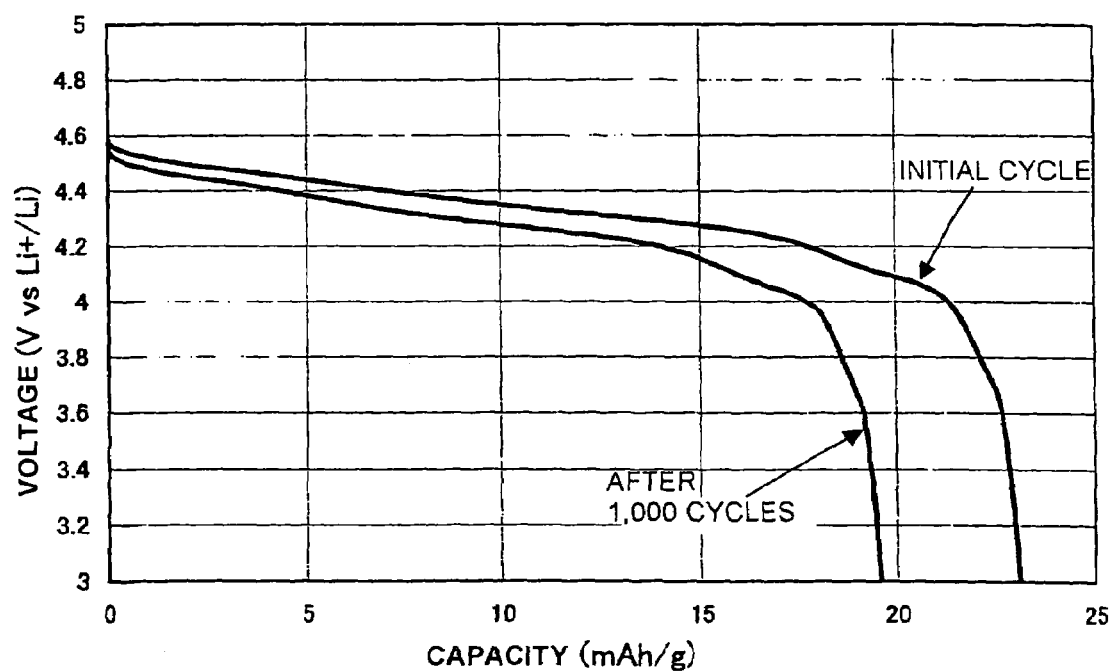
FIG. 10 is a diagram showing discharge curves of a graphite M.
Figure 11:
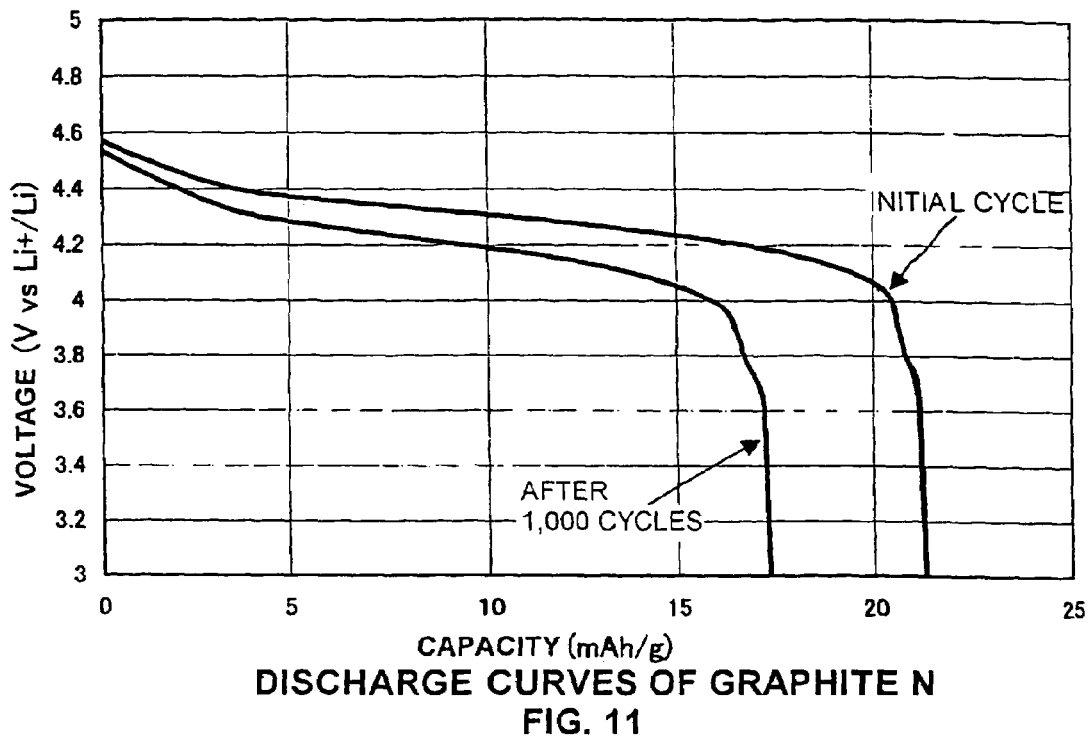
FIG. 11 is a diagram showing discharge curves of a graphite N.
Figure 12:
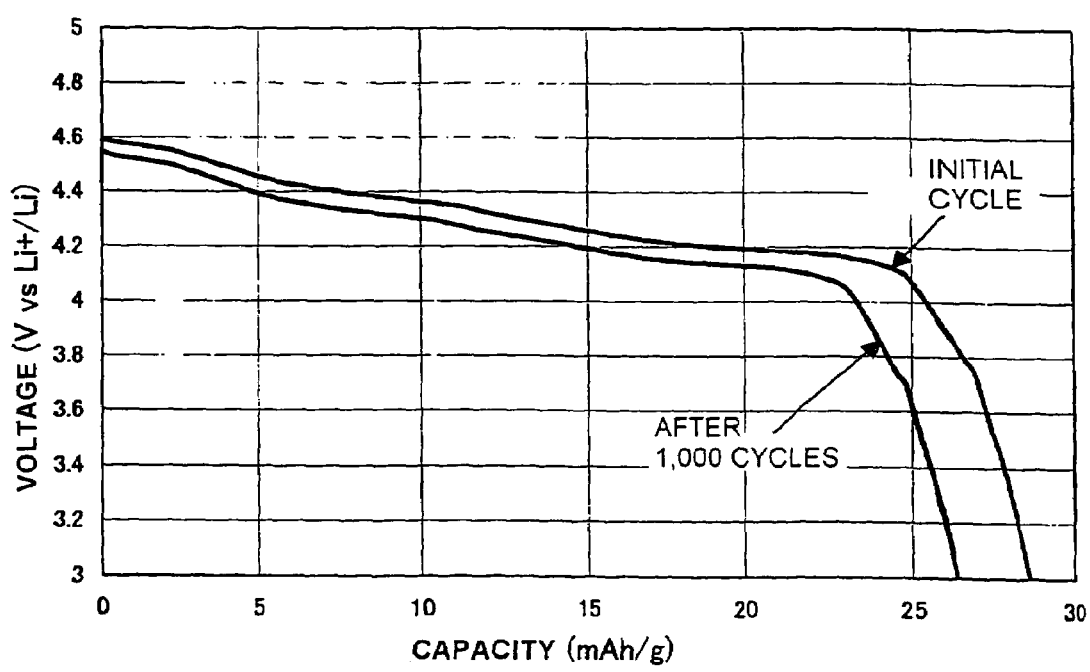
FIG. 12 is a diagram showing discharge curves of a graphite

However, there were some graphites that did not show this tendency. For example, charge discharge curves of the graphite M and N are shown in FIGS. 10 and 11. The Lc (112) values of the graphites M and N fall within the range defined in the first aspect of the present invention, that is, within the range between 4 and 30 nm inclusive. From the view point of the preparation processes, the graphites M and N share the common feature that they have been subjected to graphitization treatment before pulverization. In such graphite materials, mechanical energy caused by pulverization is accumulated, the degree of unevenness of particle surface is large, and distortion is introduced in the crystal structure. For these reasons, anions are less likely to be intercalated into these graphites. FIG. 12 shows a discharge curve of the graphite O which was obtained by subjecting the graphite N to 1700° C. heat treatment. It has been determined that, even graphite powders (graphites M and N) which include crystal distortion and have unevenness on the particle surfaces as a result of pulverizing graphite materials after graphitization treatment, the A/B value and the intensity ratio I(004)/I(006) thereof are reduced when they are again subjected to heat treatment as powder (graphite O).

Meanwhile, the capacity retention ratio after 1,000 cycles is significantly reduced when the Lc (112) value is less than 4 nm, or greater than 30 nm. As defined in the first aspect of the present application, the capacity retention rate was 80% or above when the Lc (112) was 4 or more and 30 nm or less.

When the crystallite was less than 4 nm, the discharge capacity at the initial cycle and the capacity retention rate after 1,000 cycles increased as the Lc (112) value increased. When the crystallite size reached 4 nm, the capacity retention rate was particularly increased. This phenomenon means that it is possible for small crystallites to absorb/desorb anions, however, cycle deterioration tends to occur before the crystallites are developed into a certain size, and the certain size can be determined to be 4 nm.

Meanwhile, when the crystallite size exceeds 30 nm, a tendency was observed that the charge capacity retention rate after 1,000 cycles was reduced as the Lc (112) value increased, although the discharge capacity at the initial cycle was relatively large. One of the causes of this tendency is the large capacity that allows absorption/desorption of anions. However, the main cause is that cycle deterioration tends to take place owing to the crystallite being too large. Accordingly, for improved cycle characteristics, appropriately small size crystallites are more advantageous, and the size can be determined to be 30 nm.

As described above, the capacity retention rate after 1,000 cycles was 80% or more when the Lc (112) fell in the range between 4 and 30 nm. This numerical range is absolutely imperative to improve cycle characteristics of a graphite material to be used as a positive electrode.

Figure 13:
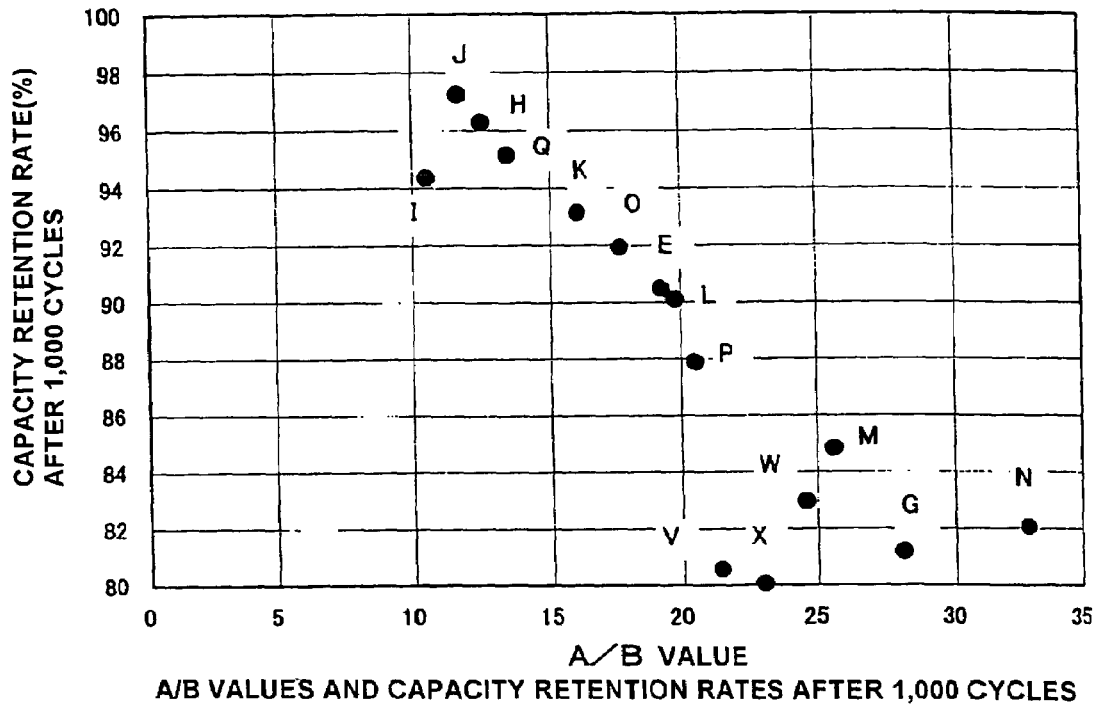
FIG. 13 is a diagram showing a relationship between an A/B value and the capacity retention rate after 1,000 cycles.

With regard to the graphite materials E, G, H, I, J, K, L, M, N, O, P, Q, V, W and X in each of which the L (112) is in the range of 4 to 30 nm, a relationship between a value of the ratio of the specific surface area A determined by a nitrogen absorption (BET) procedure to the surface area B determined on the basis of an area average diameter (A/B value), and the capacity retention ratio after 1,000 cycles are shown in FIG. 13. A tendency was observed that the capacity retention ratio after 1,000 cycles was reduced as the A/B value increased. Consequently it can be understood that cycle deterioration tends to occur when the roughness (irregularity) of particle surface is larger. However, in the cases where the A/B values exceeded 20, such a distinct tendency was not observed. This is considered to be because graphite powders in this range were caused to have a large amount of roughness and a complicated shape of roughness, making it difficult to accurately grasp the state of roughness even on the basis of the A/B value.

As to the graphites (P, V, X, W, M, G and N) where the discharge capacity retention ratio after 1,000 cycles was 90% or less, all the graphite materials except for P and V were made by being subjected to graphitization treatment before being pulverized. That the crystallites were small in size can be cited as another cause of the relatively small discharge capacity retention rate of the graphite materials P and V, although they were made by being subjected to pulverization treatment prior to graphitization treatment. In addition, since the graphites H and L were subjected to graphitization treatment prior to pulverization treatment, performing pulverization treatment prior to graphitization treatment is an effective means of reducing the A/B value even when the A/B value is 20 or less. However, it can be understood that, even when graphite materials are subjected to graphitization treatment prior to pulverization treatment, it is possible to make the A/B value 20 or less selection of the starting material. FIG. 13 shows that graphite materials with the A/B values 20 µm or less need to be used in order to make the discharge capacity retention rate after 1,000 cycles to be 90% or more even if the Lc (112) is 4 to 30 nm.

Figure 14:
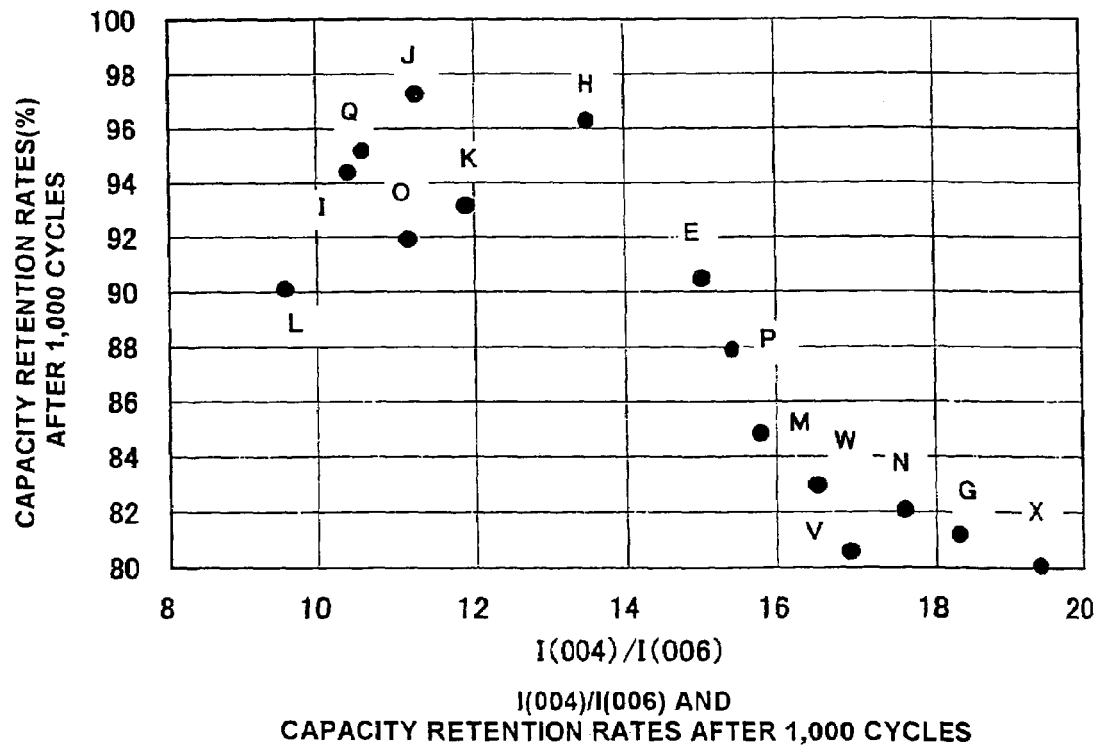
FIG. 14 is a diagram showing a relationship between an I(004)/I(006) and the capacity retention rate after 1,000 cycles.

Similarly, with regard to the graphite materials E, G, H, I, J, K, L, M, N, O, P, Q, V, W and X each of which the Lc (112) is in the range of 4 to 30 nm, a relationship between the intensity ratio I(004)/I(006) and the discharge capacity retention rate is shown in FIG. 14. Here, the intensity ratio I(004)/I(006) is the ratio of the intensity (004) of the diffraction line corresponding to the (004) plane to the intensity I(006) of the diffraction line corresponding to the (006) plane, which are measured by an X-ray wide angle diffraction method.

In the case of graphite materials with the intensity ratio I(004)/I(006) greater than 15 were used, the discharge capacity retention ratio was reduced as the intensity ratio increased. Meanwhile, with regard to graphite materials with the intensity ratio 15 or less, a distinct tendency was not observed in the relationship between the intensity ratio and the discharge capacity retention rate. This is considered to be because graphite materials included in this range had extremely small lattice distortion in its crystallites, making it impossible to accurately grasp the difference in lattice distortion on the basis of the intensity ratio. It was the graphite materials with the intensity ratio I(004)/I(006) of 15 or less that achieved 90% or more discharge capacity retention rate. It was determined that, even when the Lc (112) ranges between 4 and 30 nm, it is possible to further improve cycle characteristics if graphite materials with small lattice distortion (with the intensity ratio I(004)/I(006) 15 or less) are used.

Figure 7:
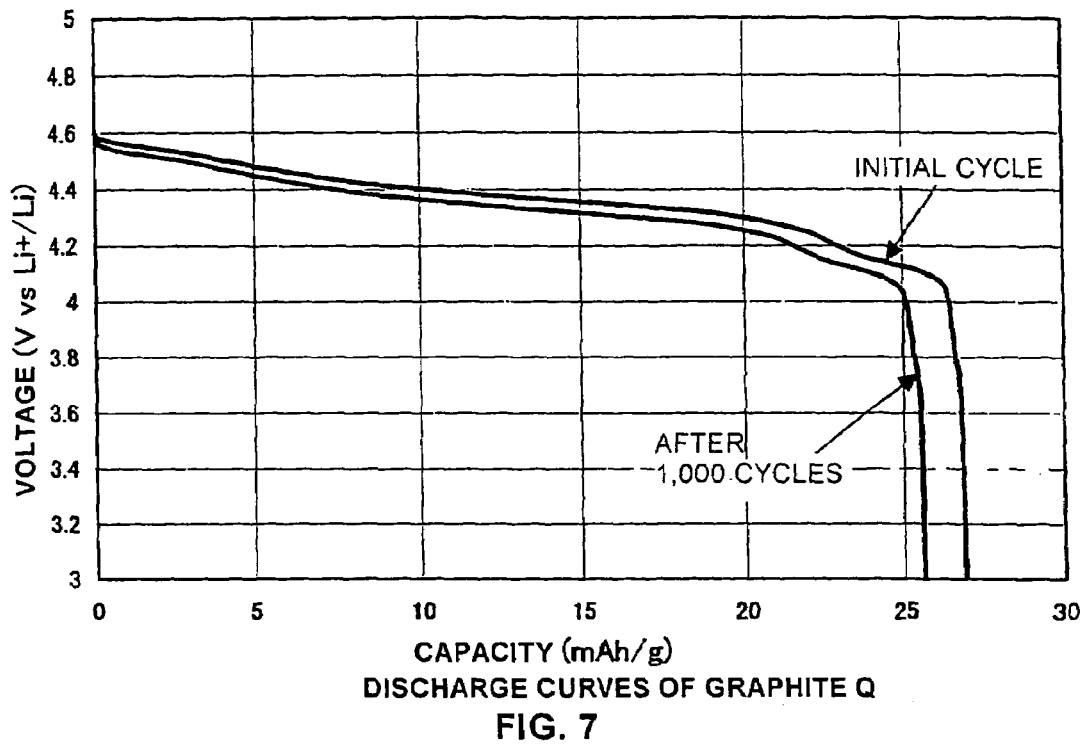
FIG. 7 is a diagram showing discharge curves of a graphite Q.
Figure 8:
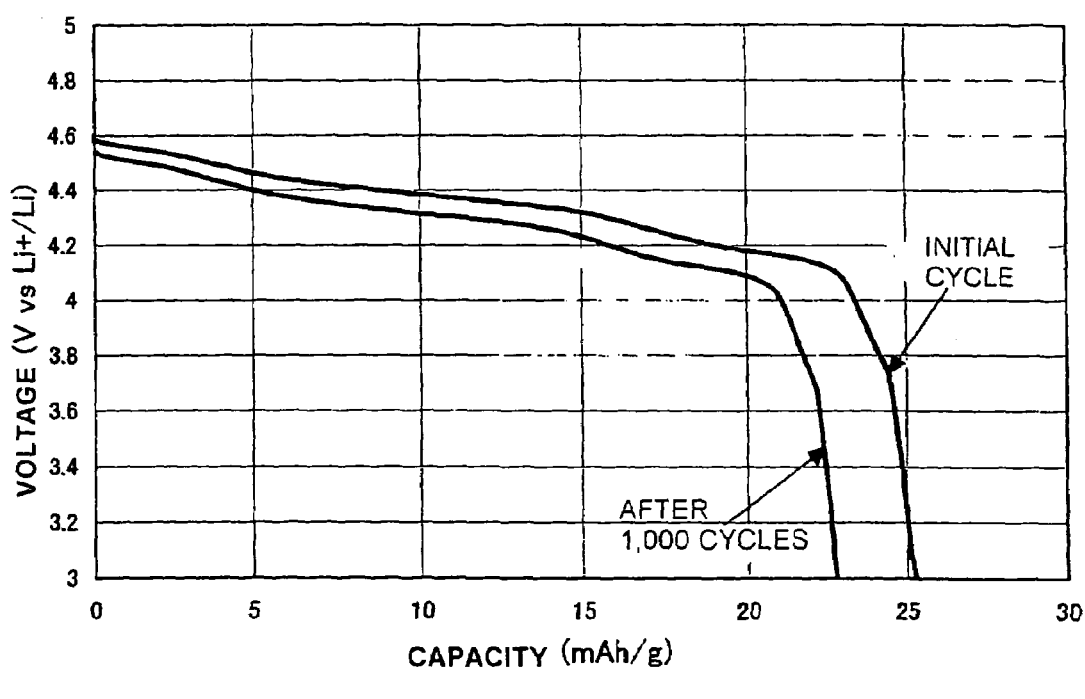
FIG. 8 is a diagram showing discharge curves of a graphite L.
Figure 9:
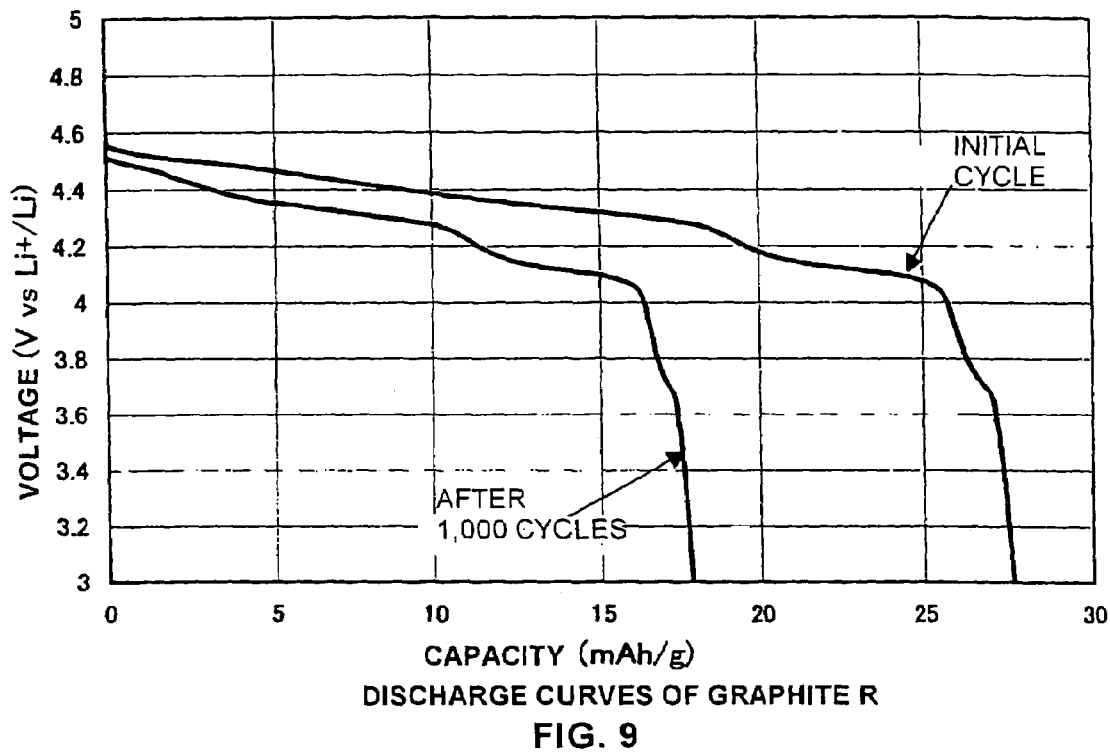
FIG. 9 is a diagram showing discharge curves of a graphite R.
Figure 15:
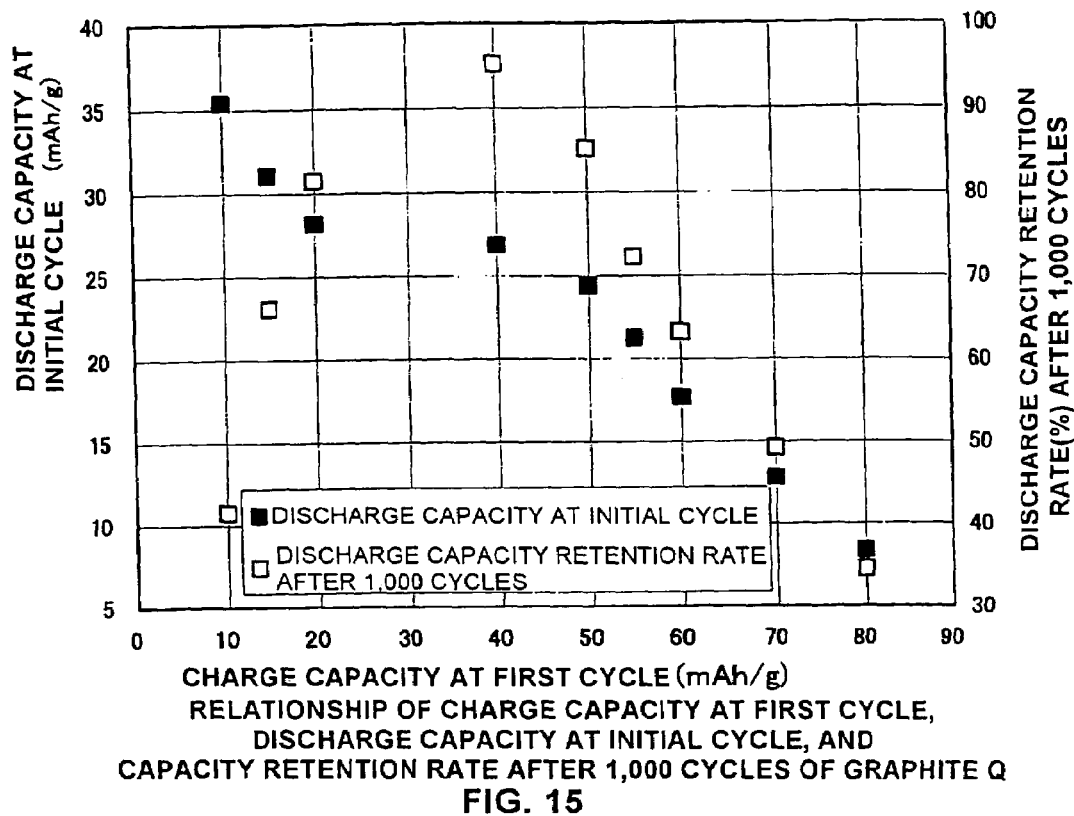
FIG. 15 is a diagram showing a relationship between a charge capacity at a first cycle regarding the graphite Q, and the discharge capacity at the initial cycle and the capacity retention rate after 1,000 cycles.
Figure 16:
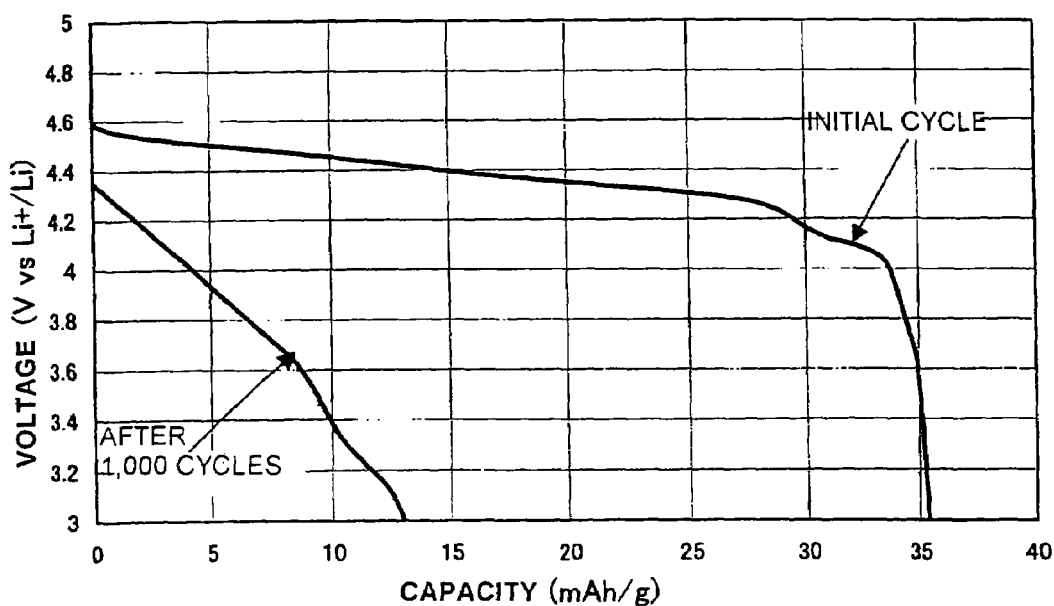
FIG. 16 is a diagram showing discharge curves of the graphite Q in a case where the discharge capacity at the first cycle is 10 mAh/g.
Figure 17:
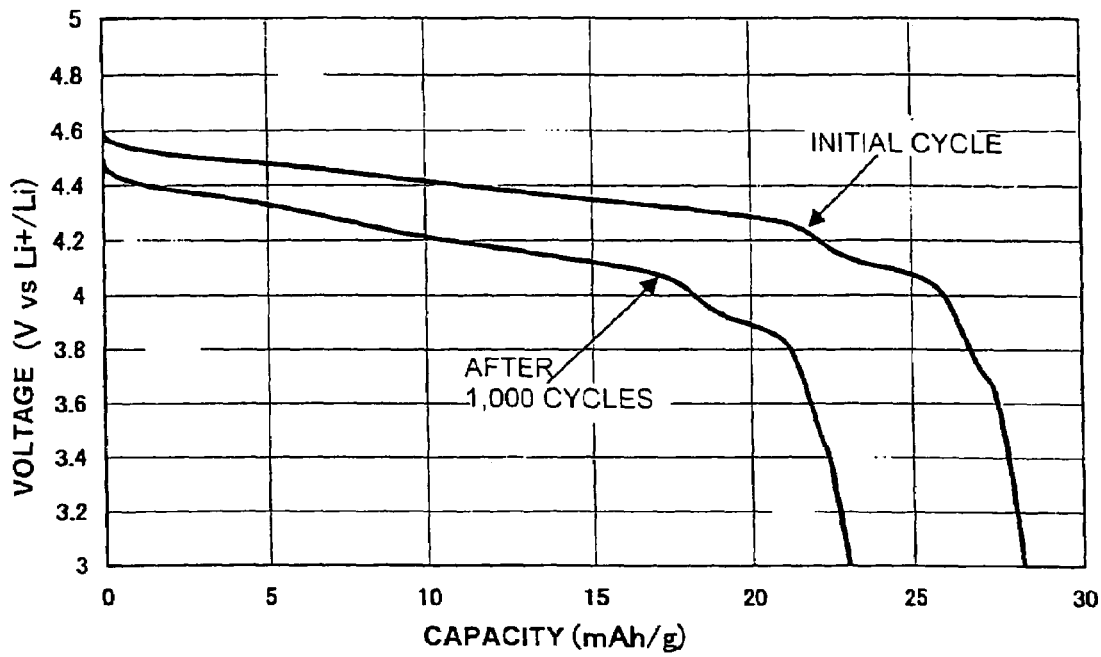
FIG. 17 is a diagram showing discharge curves of the graphite Q in a case where the discharge capacity at the first cycle is 20 mAh/g.
Figure 18:
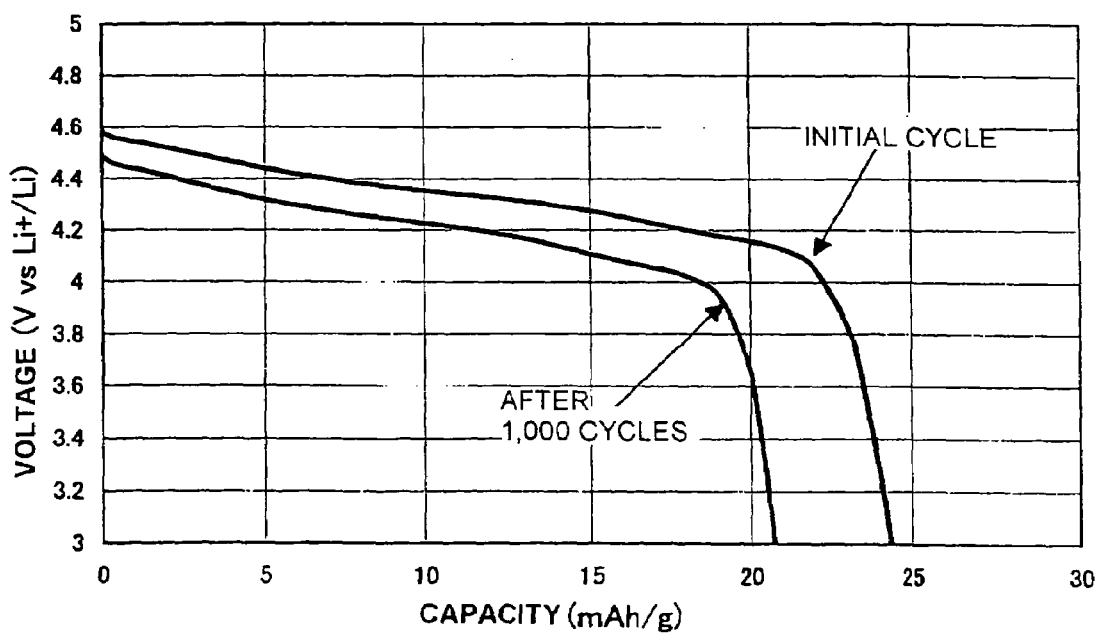
FIG. 18 is a diagram showing discharge curves of the graphite Q in a case where the discharge capacity at the first cycle is 50 mAh/g.
Figure 19:
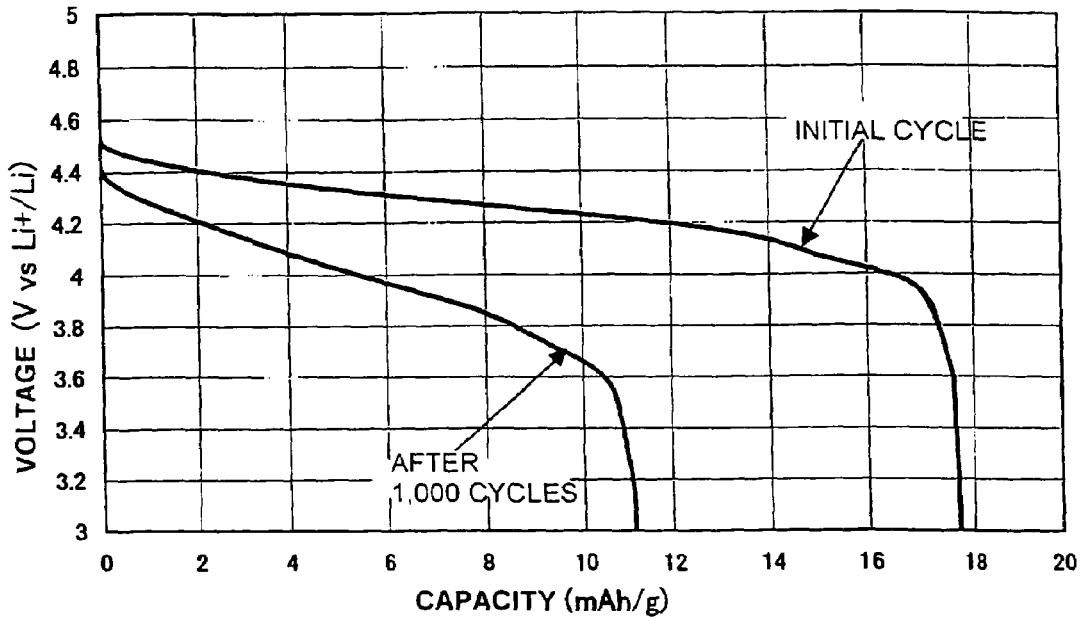
FIG. 19 is a diagram showing discharge curves of the graphite Q in a case where the discharge capacity at the first cycle is 60 mAh/g.
Figure 20:
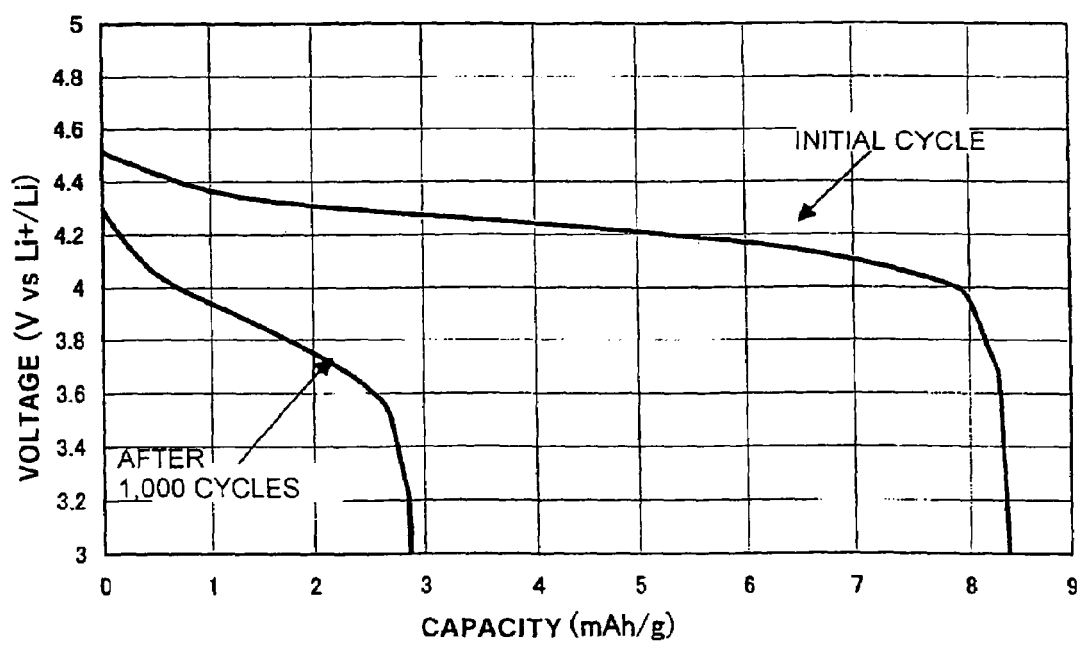
FIG. 20 is a diagram showing discharge curves of the graphite Q in a case where the discharge capacity at the first cycle is 80 mAh/g.

The discharge capacity and cycle characteristics were compared, in a case with the charge capacity of the graphite Q at the first cycle altered between 10 and 80 mAh/g. FIG. 15 shows a relationship between the charge capacity at the first cycle and the discharge capacity at the initial cycle, and a relationship between the charge capacity at the first cycle and the capacity retention ratio after 1,000 cycles. Moreover, the following Table 3 shows the charge capacity at the first cycle, the discharge capacity at the initial cycle, the discharge capacity after 1,000 cycles, and the discharge capacity retention rates thereof. FIGS. 16 to 20 respectively show discharge curves in cases where the charge capacities at the first cycle were 10, 20, 50, 60 and 80 mAh/g. Note that, FIG. 7 shows a discharge curve in a case where the discharge capacity at the first cycle was 40 mAh/g. In FIG. 15, a tendency was observed that the smaller the charge capacity at the first cycle was, the larger the discharge capacity is at the initial cycle. This is because the charge/discharge test was performed under the condition where a voltage range is from 4.65 to 3.0 (V vs Li+/Li). As described above, as the charge capacity at the first cycle is made larger, the irreversible capacity generated at the first cycle becomes larger, and even when an electrode is in a discharged state, a large amount of intercalates (residual compounds) are produced that are held into a graphite crystal and are in a state where discharging is impossible. Thus, in this electrode, the rest potential in the discharged state is more positive compared to an electrode provided with a small charge capacity at the first cycle. Accordingly, when the two electrodes are charged to a certain capacity, the electrode (graphite) which was provided with a large charge capacity at the first cycle necessarily offers more positive voltage at the end of charging. When charging/discharging is performed within a predetermined voltage range, charging is terminated at a point where a voltage reaches a predetermined potential. For this reason, graphite electrodes which are provided with a large charge capacity at the first cycle necessarily offer smaller charge/discharge capacities at the second and subsequent cycles.

TABLE 3

| Charge capacity(mAh/g) at the first cycle | Discharge capacity(mAh/g) at the initial cycle | Discharge capacity(mAh/g) after 1,000 cycles | Discharge capacity retention rate (%) |
| --- | --- | --- | --- |
| 10 | 35.4 | 14.7 | 41.5 |
| 15 | 31.1 | 20.6 | 66.2 |
| 20 | 28.2 | 23.0 | 81.6 |
| 40 | 26.9 | 25.6 | 95.2 |
| 50 | 24.4 | 20.8 | 85.2 |
| 55 | 21.3 | 15.4 | 72.3 |
| 60 | 17.7 | 11.2 | 63.3 |
| 70 | 12.8 | 6.3 | 49.2 |
| 80 | 8.4 | 2.9 | 34.5 |

Meanwhile, the discharge capacity retention rate after 1,000 cycles was reduced when the charge capacity at the first cycle was either small or large, and the maximum value thereof was seen near 40 mAh/g. When the charge capacity at the first cycle is small, a large charge/discharge capacity is obtained at the second and subsequent cycles, causing a larger amount of intercalates to be absorbed in, and desorbed from a graphite crystal. Thus, the graphite crystal tends to collapse, which facilitates cycle deterioration. Further, when the charge capacity at the first cycle is large, charging/discharging is performed in a state where a large amount of residual compounds are present in a crystal structure. For this reason, physical properties of a graphite powder (particle surface, in particular) are changed, the graphite powder has a high degree of reactivity to an electrolyte, and particle surface is covered with the reaction products between the graphite powder and the electrolyte, thereby leading to increased resistance polarization to cause cycle deterioration.

As described above, the charge capacity at the first cycle is an important factor which influences subsequent charge/discharge characteristics of graphite materials, and excellent positive electrode characteristics cannot be provided unless this factor is accurately defined. Accordingly, the effects of this invention cannot be obtained unless the charge capacity at the first cycle is defined in the first place. It can be understood from FIG. 15 that the charge capacity at the first cycle needs to be set at 20 to 50 mAh/g in order to obtain 80% or more discharge capacity retention rate after 1,000 cycles. The present inventors have confirmed that, in addition to the graphite Q, other graphite powders with the Lc (112) of 4 to 30 nm exhibit a similar tendency.

Accordingly, it can be understood that by setting the charge capacity of the graphite material for a positive electrode at the first cycle to 20 to 50 mAh/g provides a relatively large discharge capacity and stability of cycle characteristics. It is imperative to define the charge capacity at the first cycle in this way, in view of simultaneously achieving capacity and cycle characteristics of a graphite material, which serves as a positive electrode.

As described above, graphite materials which satisfied the requirements that the Lc (112) of 4 to 30 nm and that the charge capacity at the first cycle of 20 to 50 mAh/g, which are defined in the first aspect of the present invention, also satisfied such criteria that the discharge capacity is 20 mAh/g or more and that the discharge capacity retention rate after 1,000 cycles is 90% or more. Further, it is also possible to further improve cycle characteristics of the graphite materials satisfying the above requirements, by having the A/B value 20 or less, and by making the intensity ratio I(004)/I(006) 15 or less with regard to a graphite powder for the positive electrode. However, even if the A/B value and the intensity ratio I(004)/I(006) are 20 or less and 15 or less respectively, excellent cycle characteristics cannot be provided in the case where the Lc (112) value is 4 nm or less or 30 nm or more.

Meanwhile, as has been repeatedly described, there are roughly two main types of methods for preparing graphite powders, which are a method of performing pulverization treatment prior to graphitization operation; and a method of performing graphitization treatment prior to pulverization operation. If the graphite powder is intended for use as a positive electrode, it is particularly preferable that the graphite material be subject to pulverization treatment prior to graphitization treatment, since the roughness of particle surface is small (the A/B value is small) and distortion in a crystal lattice is small (the intensity ratio I(004)/I(006) is small).

The graphites J and W share a common feature that they are produced from the pitch coke as graphite raw material obtained by heating coal tar pitch manufactured by KANSAI COKE AND CHEMICALS Co., Ltd. to 1200° C. However, a difference between the graphites J and W is that the graphite W has been subjected to graphitization treatment before being pulverized, while the graphite J has been subjected to pulverization treatment before being graphitized. Although a large difference was not observed between the discharge capacity at the initial cycle, the discharge capacity retention rate after 1,000 cycles was 83.0% for the graphite W, in contrast to 97.3% for the graphite J. Meanwhile, the graphite J showed a smaller A/B value and a smaller intensity ratio I(004)/I(006) than graphite W. Accordingly, it has been determined that it is possible to reduce the roughness of particle surface and reduce distortion in a crystal lattice by performing the pulverization treatment prior to the graphitization treatment. A similar tendency was observed when the graphites Q and X were compared. For this reason, it has been determined that a preparation method in which a material is subject to the pulverization treatment prior to the graphitization treatment is an effective method of improving cycle characteristics of a graphite material for a positive electrode.

Meanwhile, the graphite N is a graphite powder obtained by graphitizing a carbonized mesophase pitch and then pulverizing the graphitized mesophase pitch. The graphite O is obtained by subjecting this graphite N to 1700° C. heat treatment under inert gas atmosphere. The discharge capacity at the initial cycle was 28.5 mAh/g for the graphite O, in contrast to 21.2 mAh/g for the graphite N. A large difference was not observed between their Lc (112). Thus, it can be considered that the 1700° C. heat treatment reduced lattice distortion in crystallites, and lattice defects were reduced, increasing crystal regions which allow anions to be reversibly absorbed/desorbed, and therefore the capacity was increased. Further, the graphite N showed a smaller A/B value and a smaller intensity ratio I(004)/I(006) than graphite O, thus supporting a conclusion that 1700° C. heat treatment reduced the roughness of particle surface, and also reduced distortion in the crystal lattice.

The capacity retention rate after 1,000 cycles was 92.1% for the graphite O, in contrast to 82.1% for the graphite N. The reasons for the improved cycle characteristics are the same as the reasons in the case of the increase in the charge capacity. It has been considered that, even when a graphite powder that has been graphitized before pulverization is used, by subjecting the graphite powder to 1700° C. heat treatment both the discharge capacity and cycle characteristics are improved. In addition, by comparison of the graphite G and H, it has been confirmed that a similar effect can be obtained even with 2800° C. heat treatment. From the results described above, it has been determined that it is possible to improve cycle characteristics as a positive electrode by subjecting the graphite powders to heat treatment at 1700° C. or above under inert gas atmosphere.

Figure 21:
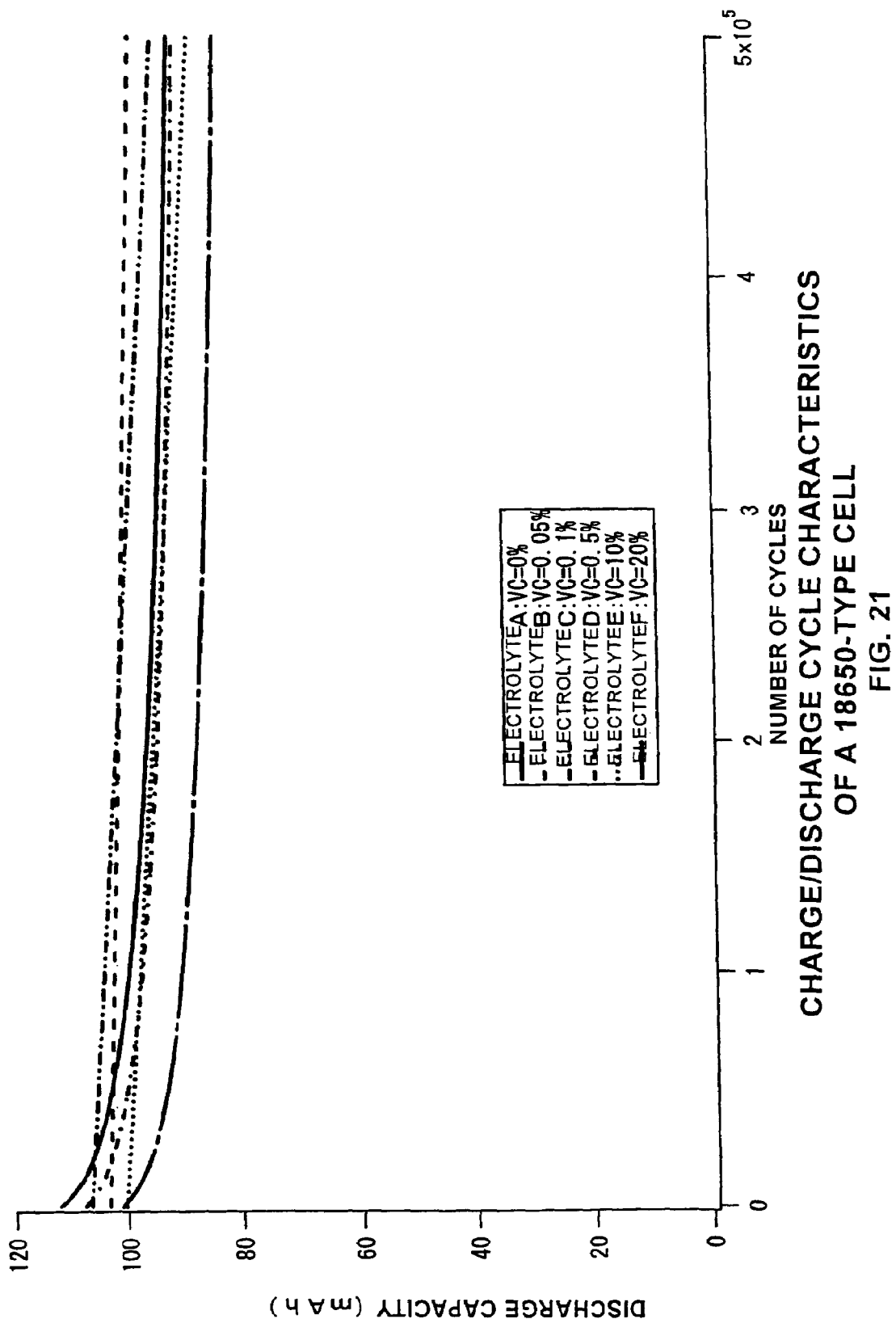
FIG. 21 is a diagram showing charge/discharge cycle characteristics of the 18650-type cell.
Figure 22:
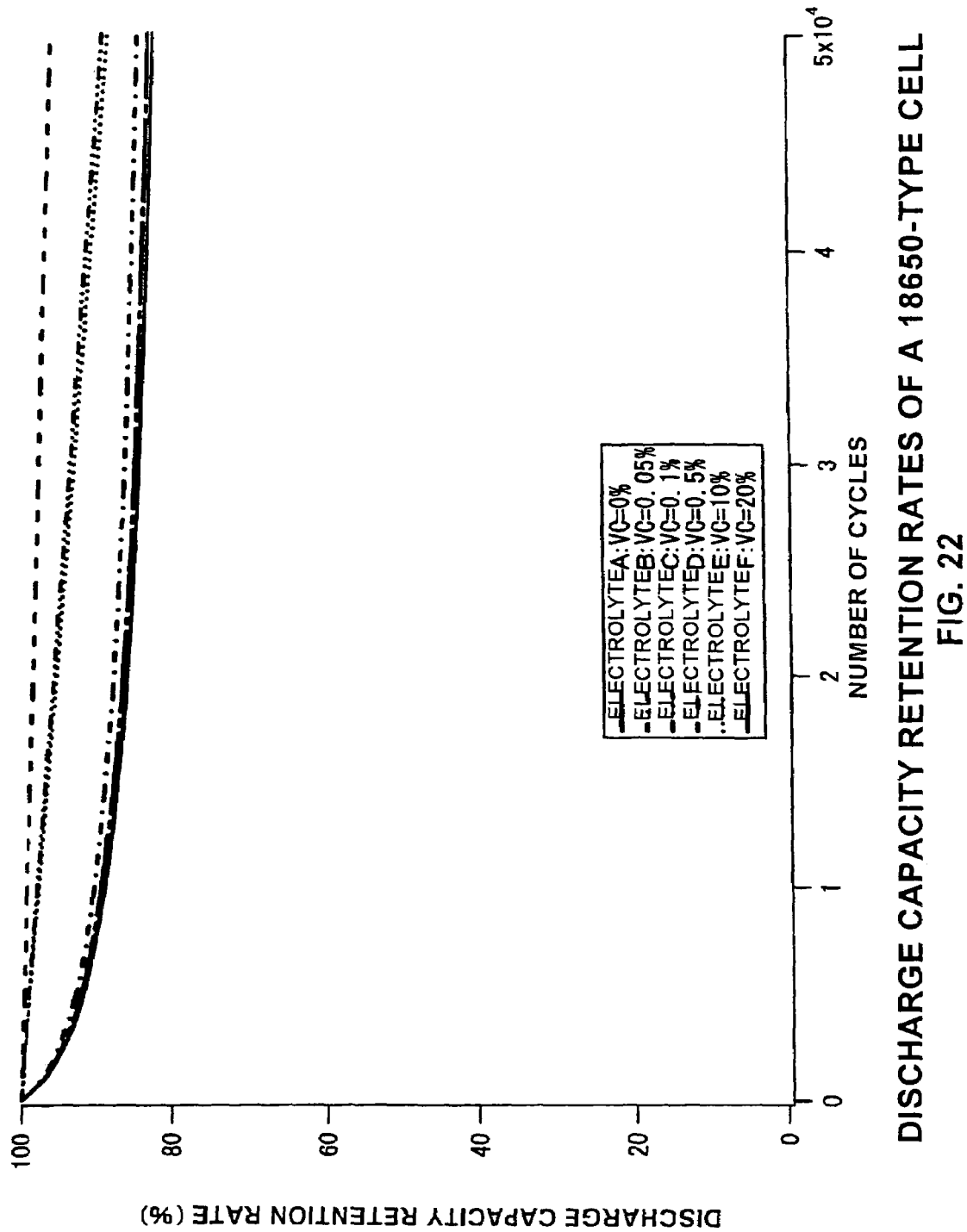
FIG. 22 is a diagram showing the discharge capacity retention rate of the 18650-type cell.
Figure 23:
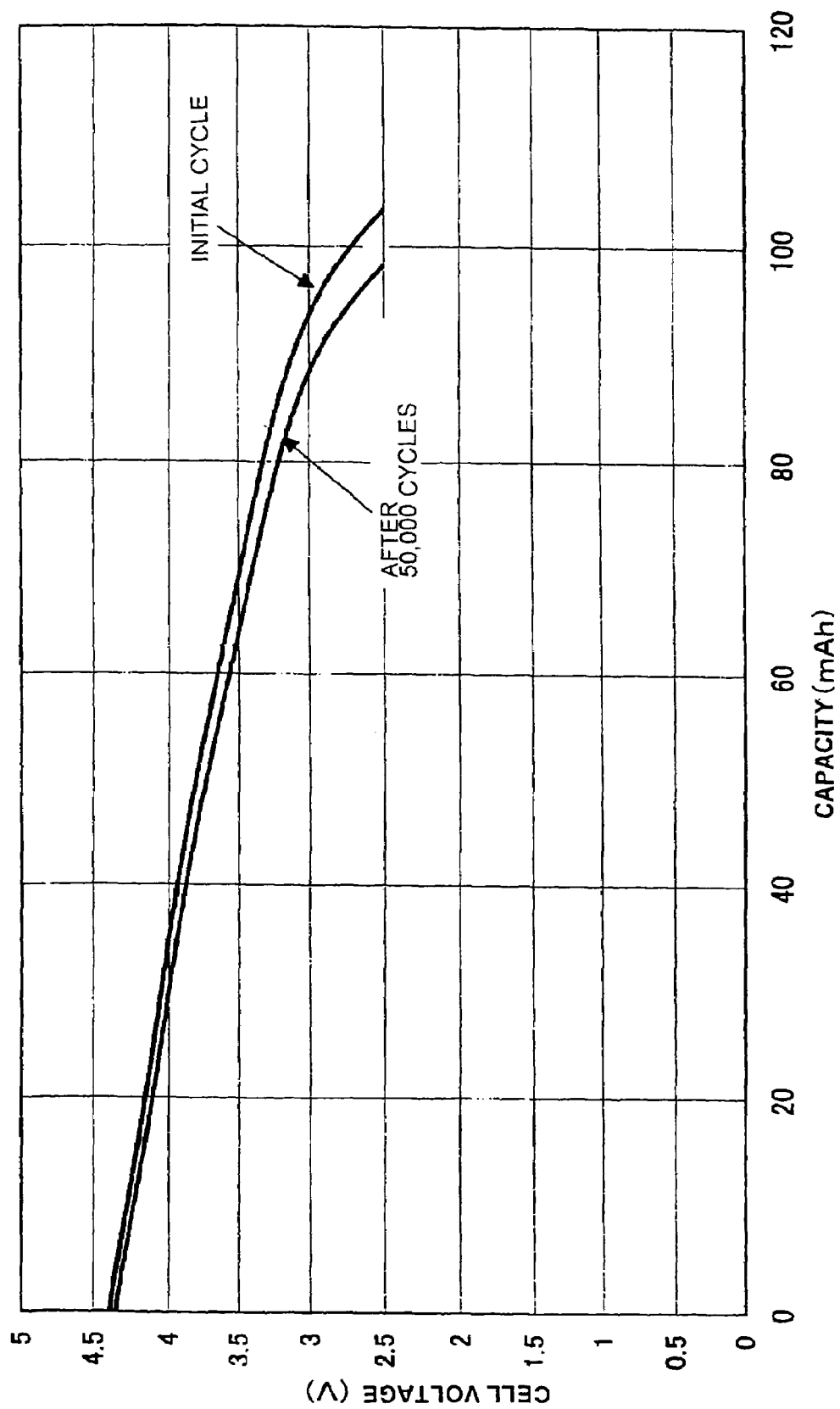
FIG. 23 is a diagram showing discharge curves of the 18650-type battery.

Next, FIG. 21 shows the change of the capacity with the number of cycles in the 18650-type non-aqueous electrolyte secondary battery in which the graphite F is used as the positive electrode and pitch coke is used as the negative electrode. FIG. 22 shows the change of the capacity retention rate with the number of cycles. In addition, FIG. 23 shows discharge curves at the initial cycle and after 50,000 cycles, where the example shown in a case in which the volume rate of VC accounts for 0.5% of the total volume of the solvent, which gives a maximum capacity retention rate. Note that the term capacity retention ratio means the discharge capacity after 50,000 cycles relative to the discharge capacity at the initial cycle, expressed as a percentage. For each electrolyte, the capacity retention rate after 50,000 cycles that is read from FIG. 22 is shown in the following Table 4.

TABLE 4

Capacity Retention Rate After 50,000 Cycles

| Electrolyte | Volume ratio containing Vinylene Carbonate (volume %) | Capacity retention rate (%) after 50,000 cycles |
| --- | --- | --- |
| Electrolyte A | 0 | 81.7 |
| Electrolyte B | 0.05 | 84.0 |
| Electrolyte C | 0.1 | 88.5 |
| Electrolyte D | 0.5 | 95.0 |
| Electrolyte E | 10 | 87.8 |
| Electrolyte F | 20 | 82.4 |

When the volume ratio of vinylene carbonate (VC) was 0.1 to 10%, the capacity retention rate after 50,000 cycles was 85% or above. On the other hand, when the volume ratio of vinylene carbonate (VC) was 0, 0.05% and 20%, the capacity retention rate was less than 85%. If the volume ratio of VC is too large, or the volume ratio is too small, increase in cycle characteristics could not achieved.

As described in detail in the above examples, the non-aqueous electrolyte secondary battery according to the present invention makes it possible to increase the initial discharge capacity, and thus a non-aqueous electrolyte secondary battery can be provided with a large capacity retention rate and excellent cycle characteristics. In addition, according to the method for preparing a positive electrode according to the present invention, a graphite powder for a positive electrode of a non-aqueous electrolyte secondary battery, which has a large initial capacity, with a stable crystal structure making it less susceptible to a collapse caused by intercalation of anions, and having excellent cycle characteristics and capacity retention rate.

Although the preferred embodiment of the present invention has been described in detail, it should be understood that various changes, substitutions and alterations can be made therein without departing from spirit and scope of the inventions as defined by the appended claims.

What is claimed is:

1. A non-aqueous electrolyte secondary battery comprising:
a positive electrode formed of a graphite powder, where a Lc (112) which is the size of crystallite in a c axis direction which is calculated from a (112) diffraction line of a graphite crystal and determined by a powder X-ray diffraction method is from 4 nm to 30 nm, and a charge capacity at the first cycle which is calculated on the basis of a total weight of a graphite material filled in the battery is 20 to 50 (mAh/g); and
a negative electrode formed of a material capable of absorption/desorption of a lithium metal and lithium,
wherein said positive electrode and said negative electrode are placed to oppose each other in an electrolyte containing lithium salt; and
wherein the graphite powder of said positive electrode has a ratio (A/B) of a specific surface area A which is determined by a nitrogen absorption (BET) method and a surface area B which is determined from an area average diameter which is 20 or less.

2. A non-aqueous electrolyte secondary battery comprising:
a positive electrode formed of a graphite powder, where a Lc (112) which is the size of crystallite in a c axis direction which is calculated from a (112) diffraction line of a graphite crystal and determined by a powder X-ray diffraction method is from 4 nm to 30 nm, and a charge capacity at the first cycle which is calculated on the basis of a total weight of a graphite material filled in the battery is 20 to 50 (mAh/g); and a negative electrode formed of a material capable of absorption/desorption of a lithium metal and lithium, wherein said positive electrode and said negative electrode are placed to oppose each other in an electrolyte containing lithium salt; and wherein the graphite powder of said positive electrode has an intensity ratio I(004)/I(006) of 15 or less, which is the ratio of an intensity I (004) of a diffraction line corresponding to a (004) surface to an intensity I (006) of a diffraction line corresponding to a (006) surface which is determined by an X-ray wide angle diffraction method.

3. A non-aqueous electrolyte secondary battery according to claim 1, wherein the electrolyte is prepared by dissolving lithium salt into a non-aqueous solvent, and vinylene carbonate accounts for 0.1 to 10 volume % of the total volume of the non-aqueous solvent.

4. A non-aqueous electrolyte secondary battery according to claim 2, wherein the electrolyte is prepared by dissolving lithium salt into a non-aqueous solvent, and vinylene carbonate accounts for 0.1 to 10 volume % of the total volume of the non-aqueous solvent.

* * * * *